US012691990B2

(12) United States Patent
Sushko et al.

(10) Patent No.: US 12,691,990 B2
(45) Date of Patent: Jul. 28, 2026

(54) AERIAL VEHICLE WITH A VOLATILE FLUID

(71) Applicant: WindBorne Systems Inc., Palo Alto, CA (US)

(72) Inventors: Andrey Sushko, Sunnyvale, CA (US); Michal Adamkiewicz, Konstancin-Jeziorna (PL); Joan Creus Costa, Redwood City, CA (US); Erik Schoenfeld, Palo Alto, CA (US)

(73) Assignee: WindBorne Systems Inc., Palo Alto, CA (US)

( * ) Notice: Subject to any disclaimer, the term of this patent is extended or adjusted under 35 U.S.C. 154(b) by 0 days.

(21) Appl. No.: 19/428,020

(22) Filed: Dec. 19, 2025

(65) Prior Publication Data

US 2026/0175959 A1      Jun. 25, 2026

Related U.S. Application Data

(60) Provisional application No. 63/736,548, filed on Dec. 19, 2024.

(51) Int. Cl.
 *B64B 1/62*          (2006.01)
(52) U.S. Cl.
 CPC ..................................... *B64B 1/62* (2013.01)

(58) Field of Classification Search
 CPC ....................................................... B64B 1/62
 See application file for complete search history.

(56) References Cited

U.S. PATENT DOCUMENTS 3,844,507 A   *   10/1974   Papst ........................ B64B 1/62
                                                                244/30
2020/0262536 A1 *   8/2020   Deakin ..................... B64B 1/20

* cited by examiner

*Primary Examiner* — Tye William Abell
(74) *Attorney, Agent, or Firm* — Run8 Patent Group, LLC; Peter Miller

(57) ABSTRACT

An aerial vehicle includes: a first inflatable element; a first mass of lifting gas contained within the first inflatable element; a second inflatable element coupled to the first inflatable element; and a second mass of a volatile fluid. The second mass of a volatile fluid: is contained within the second inflatable element; is characterized by a saturation-vapor-pressure curve that intersects an atmospheric temperature-pressure profile within an operational altitude range of the aerial vehicle; is configured to condense during ascent of the aerial vehicle across a first phase-transition altitude, in the operational altitude range, to passively reduce a net buoyancy of the aerial vehicle; and is configured to evaporate during descent of the aerial vehicle across a second phase-transition altitude, in the operational altitude range, to passively increase the net buoyancy of the aerial vehicle.

20 Claims, 9 Drawing Sheets

100

120

136

138

AIR FLOW

132

139

130

AERIAL VEHICLE WITH A VOLATILE FLUID

CROSS-REFERENCE TO RELATED APPLICATIONS

This application claims priority to U.S. Patent Application No. 63/736,548, filed on 19 Dec. 2025, which is incorporated in its entirety by this reference.

TECHNICAL FIELD

This invention relates generally to the field of radiosonde meteorology and more specifically to a new and useful aerial vehicle containing a volatile fluid for passive net buoyancy control in the field of radiosonde meteorology.

DESCRIPTION OF THE EMBODIMENTS

Figure 1:
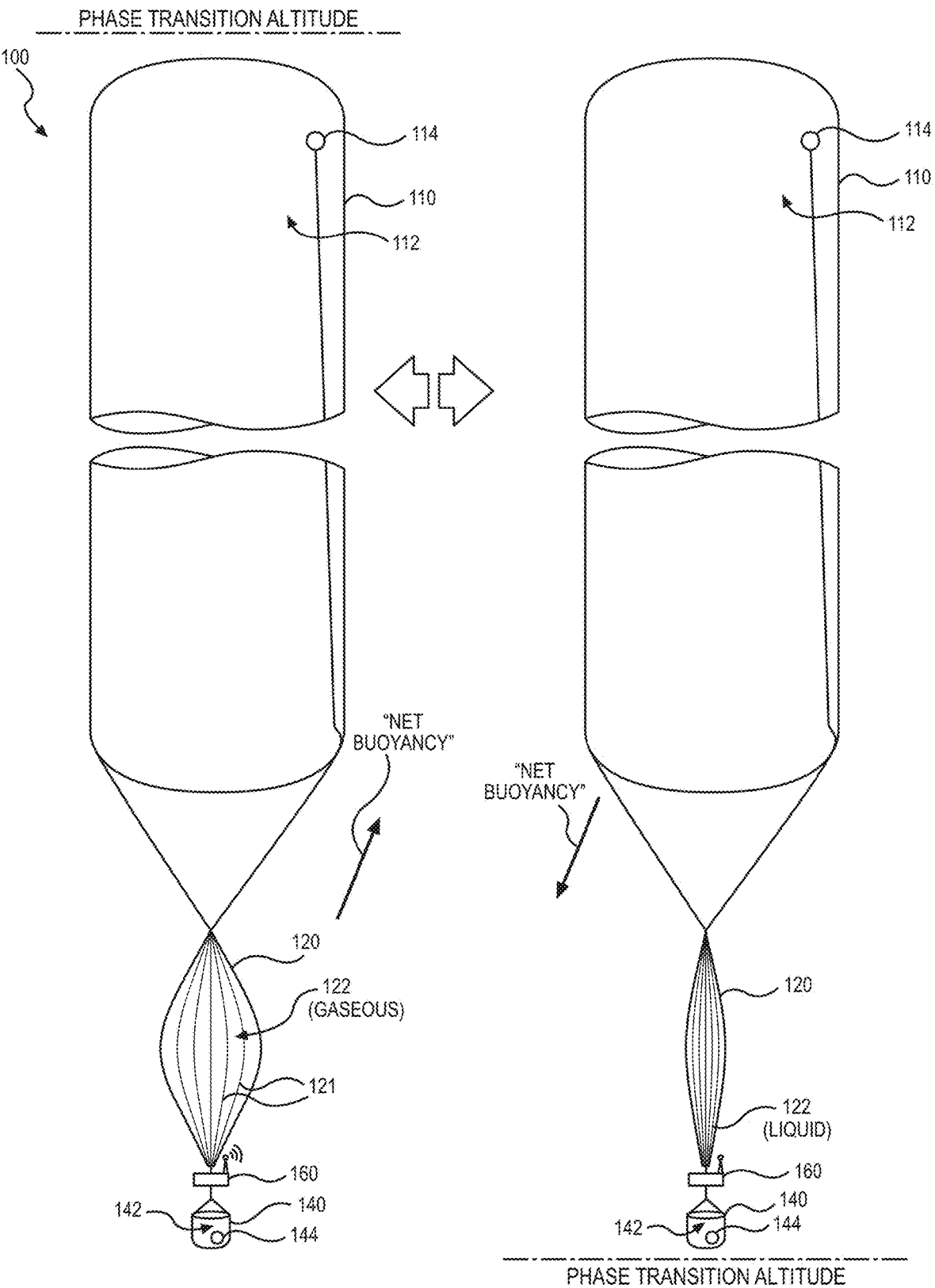
FIG. 1 is a schematic representation of an aerial vehicle.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. AERIAL VEHICLE: DUAL INFLATABLE ELEMENT+PASSIVE LIFT

As shown in FIGS. 1-5, an aerial vehicle 100 includes: a first inflatable element 110; and a first mass of lifting gas 112 (e.g., helium) arranged within the first inflatable element 110 and configured to generate aerostatic lift.

The aerial vehicle 100 also includes: a second inflatable element 120 arranged proximal (e.g., arranged within, arranged below) the first inflatable element 110; and a second mass of volatile fluid 122 (e.g., butane) arranged within the second inflatable element 120.

The second mass of volatile fluid 122 is characterized by a saturation-vapor-pressure curve (e.g., including a saturation point proximal 50,000 Pascals and 260 Kelvin) defining temperatures and pressures that yield phase transition (i.e., condensation, evaporation) of the volatile fluid 122 between gaseous and liquid states.

During descent of the aerial vehicle 100 below a phase-transition altitude (e.g., between four and six kilometers) characterized by a temperature and a pressure approximating a saturation point of the second mass of volatile fluid 122 (e.g., as represented in the saturation-vapor-pressure curve), the second mass of volatile fluid 122 transitions (e.g., vaporizes) into a gaseous state within the second inflatable element 120 to: expand the second inflatable element 120; increase displacement of ambient air about the second inflatable element 120; increase net buoyancy of the aerial vehicle 100; and slow or reverse descent of the aerial vehicle 100 below the phase-transition altitude.

During ascent of the aerial vehicle 100 above a phase-transition altitude (e.g., between four and six kilometers) characterized by a temperature and a pressure approximating a saturation point of the second mass of the volatile fluid 122 (e.g., as represented in the saturation-vapor-pressure curve), the mass of volatile fluid 122 transitions (e.g., condenses) into a liquid state within the second inflatable element 120 to: contract the second inflatable element 120; decrease displacement of ambient air about the second inflatable element 120; reduce net buoyancy of the aerial vehicle 100; and slow or reverse ascent of the aerial vehicle 100 above the phase-transition altitude.

1.1 Variation: Saturation-Vapor-Pressure Curve

In one variation shown in FIGS. 1-5, the aerial vehicle 100 includes: a first inflatable element 110; a first mass of lifting gas 112 contained within the first inflatable element 110; and a second inflatable element 120 coupled to the first inflatable element 110.

In this variation, the aerial vehicle 100 also includes a second mass of a volatile fluid 122: contained within the second inflatable element 120; characterized by a saturation-vapor-pressure curve that intersects an atmospheric temperature-pressure profile within an operational altitude range of the aerial vehicle 100; configured to condense during ascent of the aerial vehicle 100 across a first phase-transition altitude, in the operational altitude range, to passively reduce a net buoyancy of the aerial vehicle 100; and configured to evaporate during descent of the aerial vehicle 100 across a second phase-transition altitude, in the operational altitude range, to passively increase the net buoyancy of the aerial vehicle 100.

1.2 Variation: Aerial Vehicle with Predictive Venting

Another variation of the aerial vehicle 100 includes: a first inflatable element 110; a first mass of lifting gas 112 contained within the first inflatable element 110; a lifting gas vent 114 coupled to the first inflatable element 110 and configured to vent lifting gas 112, in the first mass of lifting gas 112, from the first inflatable element 110 to decrease a net buoyancy of the aerial vehicle 100; and a second inflatable element 120 coupled to the first inflatable element 110.

In this variation, the aerial vehicle 100 also includes a second mass of a volatile fluid 122: contained within the second inflatable element 120; characterized by a saturation-vapor-pressure curve that intersects an atmospheric temperature-pressure profile within an operational altitude range of the aerial vehicle 100; and configured to condense during an ascent of the aerial vehicle 100 across a phase-transition altitude, in the operational altitude range, to passively reduce a net buoyancy of the aerial vehicle 100.

In this variation, the aerial vehicle 100 also includes a controller 160 configured to: access a target maximum altitude specified for the aerial vehicle 100; and calculate a first ascent rate of the aerial vehicle 100 and estimate a predicted maximum altitude of the aerial vehicle 100 based on the first ascent rate during ascent of the aerial vehicle 100 and before the aerial vehicle 100 reaches the target maximum altitude. During the ascent of the aerial vehicle 100, the controller 160 is also configured to withhold activation of the lifting gas vent 114 to withhold venting of lifting gas 112, in the first mass of lifting gas 112, from the first inflatable element 110 in response to the predicted maximum altitude falling below the target maximum altitude.

1.3 Variation: Aerial Vehicle with Active Lift Controls

Figure 2:
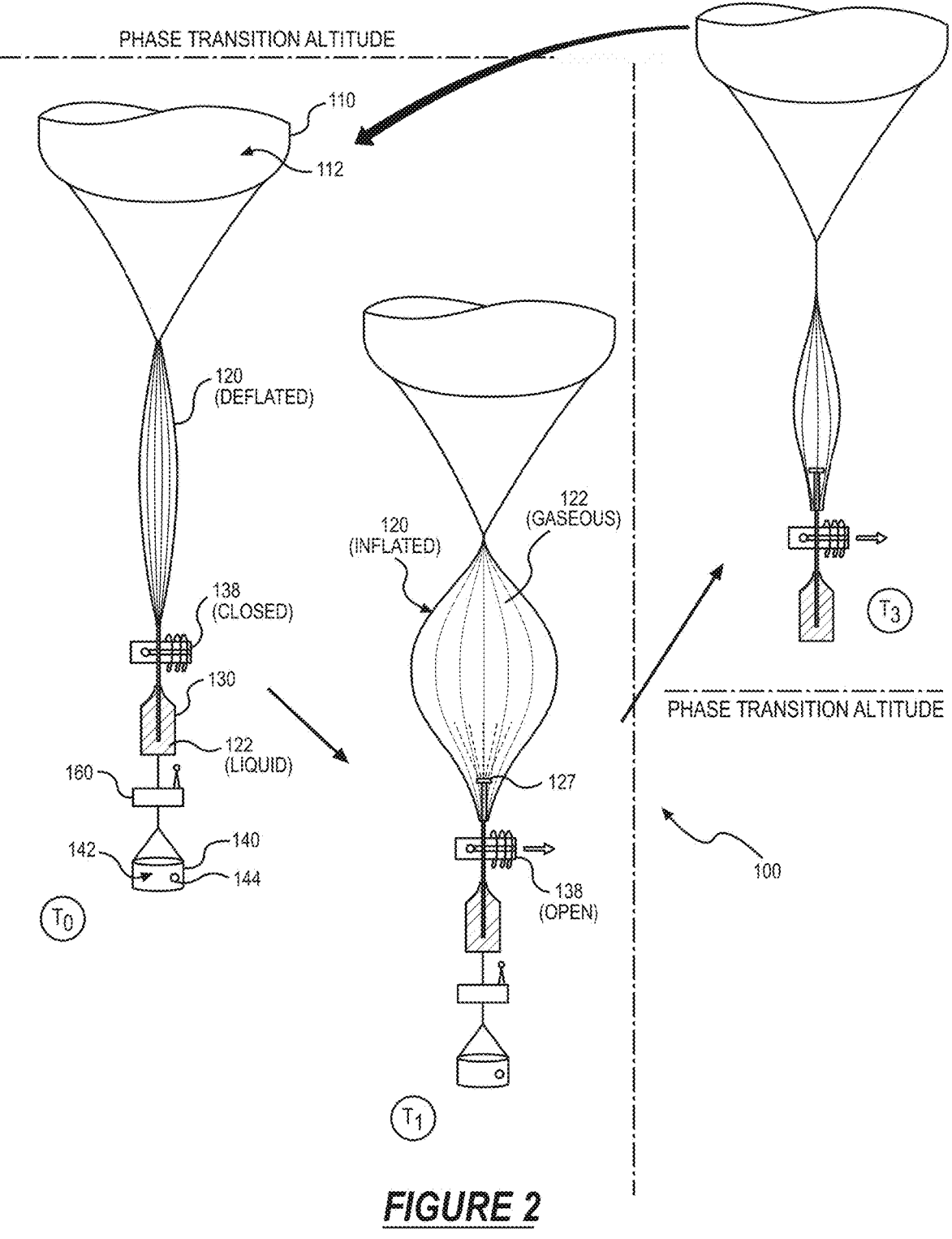
FIG. 2 is a schematic representation of one variation of the aerial vehicle.

In one variation shown in FIG. 2, the aerial vehicle 100 further includes: a condensate vessel 130 (e.g., a condensate vessel 130); a condensate valve 138 (e.g., a fill-and-release valve); a heating element 139 (e.g., a resistive heating coil); and/or a controller 160.

The condensate vessel 130: is coupled to the second inflatable element 120; and is configured to store the second mass of volatile fluid 122 in the liquid state.

The heating element 139: is arranged within the condensate vessel 130; and is configured to selectively heat the second mass of the volatile fluid 122.

The condensate valve 138: is interposed between the condensate vessel 130 and the second inflatable element 120; and is configured to selectively release volatile fluid 122—heated by the heating element 139, by ambient air, and/or via solar irradiation—from the condensate vessel 130 into the second inflatable element 120.

The controller 160 is configured to: detect an anomalous hazardous atmospheric zone (e.g., characterized by increased icing potential or precipitation) within an altitude band occupied (or approached) by the aerial vehicle 100 (or receive indication of an anomalous hazardous atmospheric zone from a ground station); trigger the heating element 139 to supply thermal energy to the second mass of volatile fluid 122 to induce partial vaporization of the second mass of volatile fluid 122 within the condensate vessel 130 and/or trigger the condensate valve 138 to release a sub-volume of the volatile fluid 122—vaporized by the heating element 139, ambient air, or solar irradiation-into the second inflatable element 120 in order to increase net buoyancy of the aerial vehicle 100 and rise above the anomalous hazardous atmospheric zone.

Additionally or alternatively, the controller 160 can: access at target altitude specified in a flight plan assigned to the aerial vehicle 100; trigger the heating element 139 to supply thermal energy to the condensate vessel 130 to induce (partial) vaporization of the volatile fluid 122 occupying the condensate vessel 130 and/or trigger the condensate valve 138 to release a sub-volume of the volatile fluid 122—vaporized by the heating element 139, ambient air, or solar irradiation-into the second inflatable element 120 in order to increase net buoyancy of the aerial vehicle 100 and lift toward the target altitude while dumping less or no ballast.

Additionally or alternatively, the controller 160 can: access a target ascent duration (i.e., from minimum to maximum altitude within a single macro oscillation of the aerial vehicle 100), such as specified in the flight plan; track current altitude and current rate of ascent of the aerial vehicle 100; and estimate the current ascent duration of the aerial vehicle 100 (i.e., time to reach a peak or target altitude) based on the current altitude and the current rate of descent. If this current ascent duration is greater than the target ascent duration, the controller 160 can trigger the heating element 139 to supply thermal energy to the condensate vessel 130 to induce (partial) vaporization of the volatile fluid 122 occupying the condensate vessel 130 and/or trigger the condensate valve 138 to release a sub-volume of the volatile fluid 122—vaporized by the heating element 139, ambient air, or solar irradiation-into the second inflatable element 120 in order to increase net buoyancy of the aerial vehicle 100, increase ascent rate of the aerial vehicle 100 without dumping ballast, and thus reduce the current ascent duration.

Additionally or alternatively, the controller 160 can: access a target ascent rate, such as specified in the flight plan; and track current rate of ascent of the aerial vehicle 100. If this current rate of ascent is less than the target rate of ascent, the controller 160 can: trigger the heating element 139 to supply thermal energy to the condensate vessel 130 to induce (partial) vaporization of the volatile fluid 122 occupying the condensate vessel 130 and/or and trigger the condensate valve 138 to release a sub-volume of the volatile fluid 122—vaporized by the heating element 139, ambient air, or solar irradiation—into the second inflatable element 120 in order to increase net buoyancy of the aerial vehicle 100 and increase ascent rate of the aerial vehicle 100 without dumping ballast.

1.3.1 Variation: Volatile Fluid 122 Atomization

Figure 3:
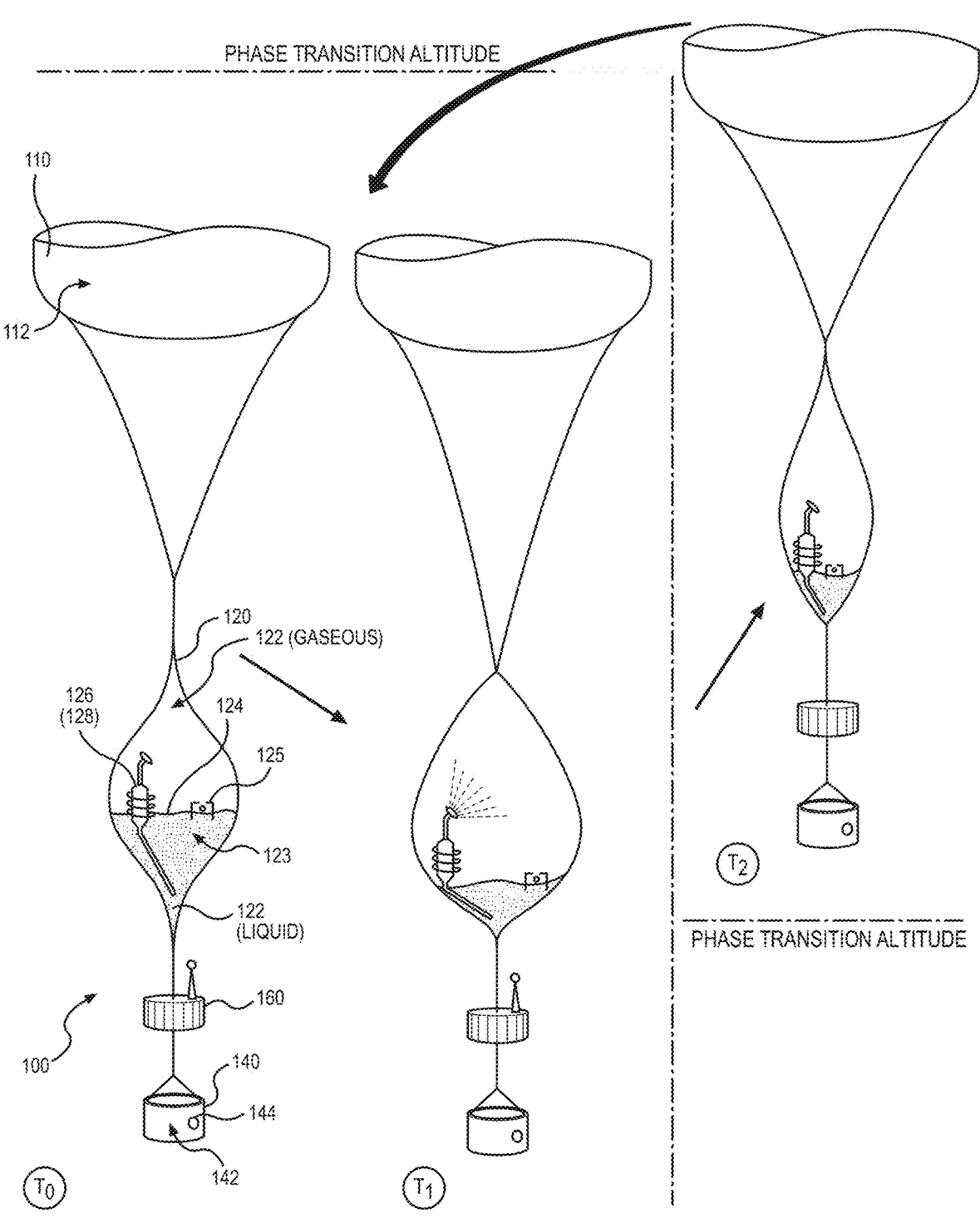
FIG. 3 is a schematic representation of one variation of the aerial vehicle.
Figure 10:
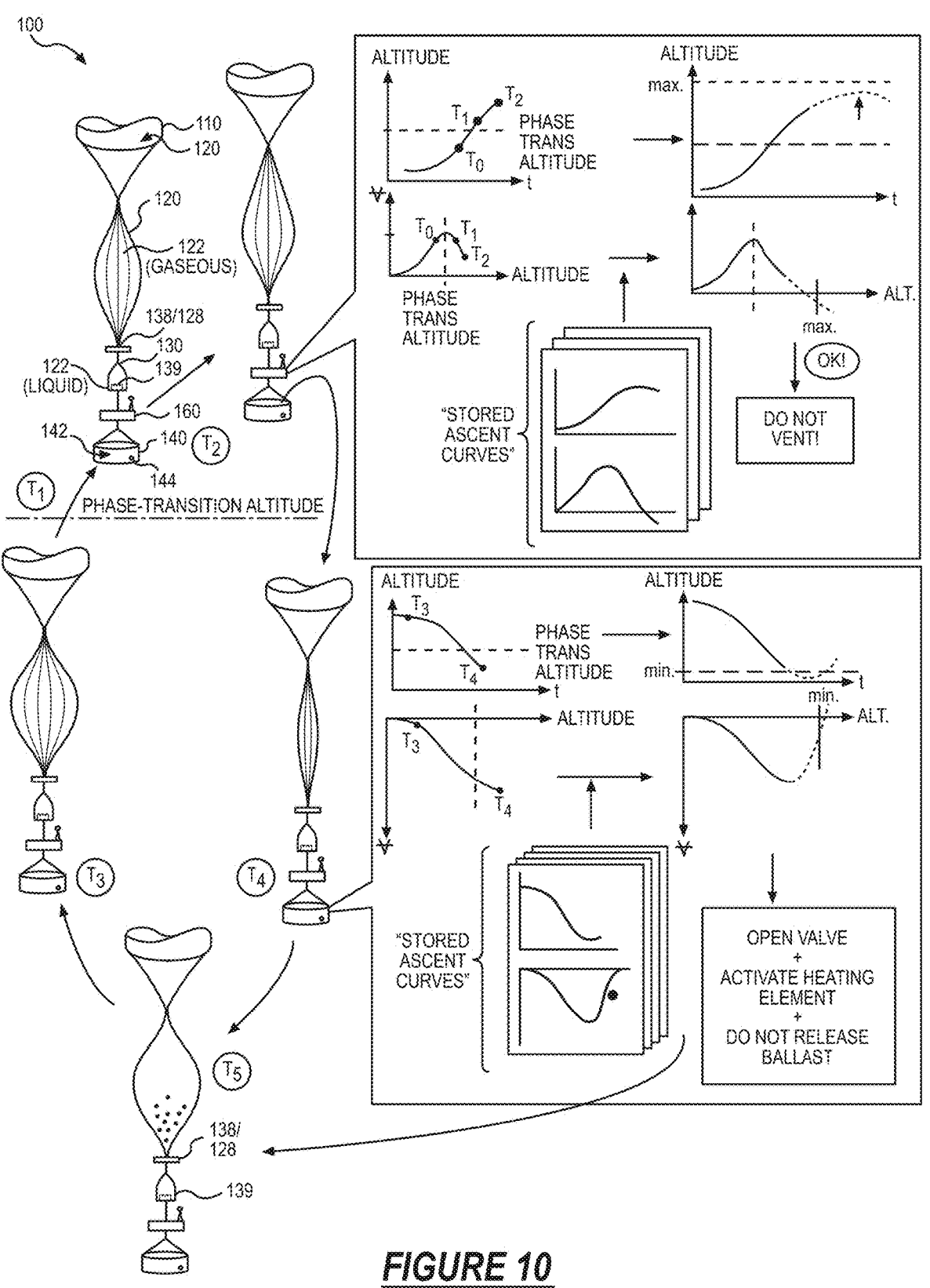
FIG. 10 is a flowchart representation of one variation of the aerial vehicle.

In this variation and as shown in FIGS. 3 and 10, the aerial vehicle 100 can additionally or alternatively include: a nozzle 127 arranged within the second inflatable element 120; a pump 128 configured to pump liquid volatile fluid 122—from the condensate vessel 130 or a sump 123 defined by the bottom of the second inflatable element 120—through the nozzle 127. The controller 160 can thus trigger the pump 128 to displace liquid volatile fluid 122 to the nozzle 127 to atomize the volatile fluid 122, thereby: increasing a rate of vaporization of the volatile fluid 122; increasing net buoyancy of the aerial vehicle 100; and/or increasing a rate of the net buoyancy increase of the aerial vehicle 100.

1.4 Variation: Heatsink

Figure 7:
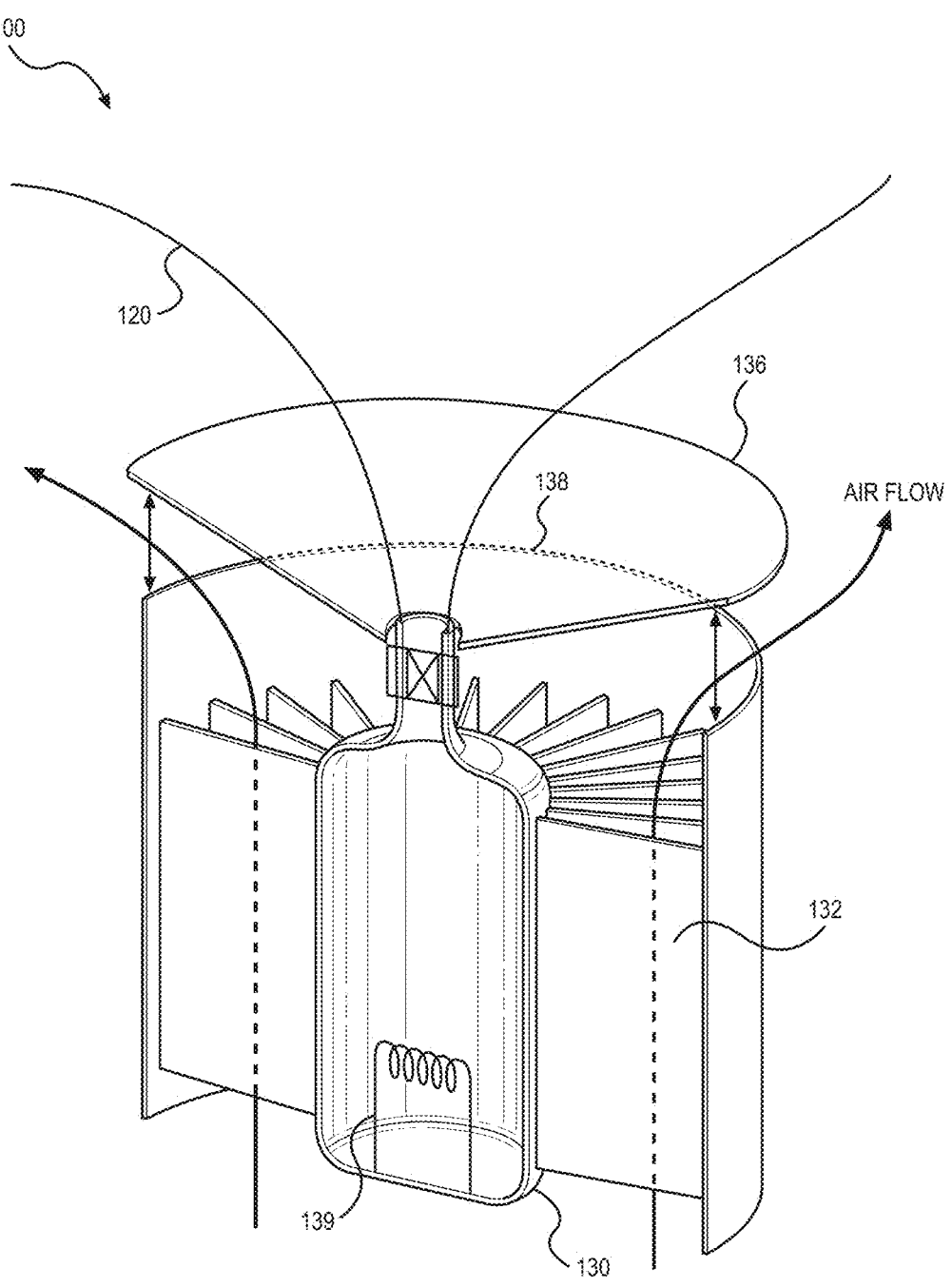
FIG. 7 is a schematic representation of one variation of the aerial vehicle.

In one variation shown in FIG. 7, the aerial vehicle 100 further includes a heatsink 132 (or a "thermal exchange element" more generally): coupled to the condensate vessel 130; and configured to transfer thermal energy between ambient air passing over the heatsink 132 and volatile fluid 122 occupying the condensate vessel 130.

In this variation, the aerial vehicle 100 can also include: a fan 134 configured to direct ambient air across the heatsink 132; and/or a vent 136 operable in a closed position to attenuate flow of ambient air over the heatsink 132 and an open position to enable flow of ambient air over the heatsink 132.

In this variation, when the aerial vehicle 100 is below the phase-transition altitude, the controller 160 can trigger the condensate valve 138 to open and/or activate the fan 134 in order to increase air flow over the heatsink 132 and increase a rate of heat transfer from ambient air into liquid volatile fluid 122 occupying the condensate vessel 130, thereby increasing a rate of evaporation of the volatile fluid 122, increasing a rate net buoyance increase of the aerial vehicle 100, and decreasing a descent rate when descending or increasing an ascent rate when ascending; and vice versa.

Similarly, when the aerial vehicle 100 is above the phase-transition altitude, the controller 160 can trigger the condensate valve 138 to open and/or activate the fan 134 in order to increase air flow over the heatsink 132 and increase a rate of heat transfer gaseous volatile fluid 122—near the bottom of the second inflatable element 120—into ambient air, thereby increasing a rate of condensation of the volatile fluid 122, increasing a rate net buoyance reduction of the aerial vehicle 100, and increasing a descent rate when descending or decreasing an ascent rate when ascending; and vice versa.

1.5 Aerial Vehicle: Nested Inflatable Elements

Figures 4, 5, 6:
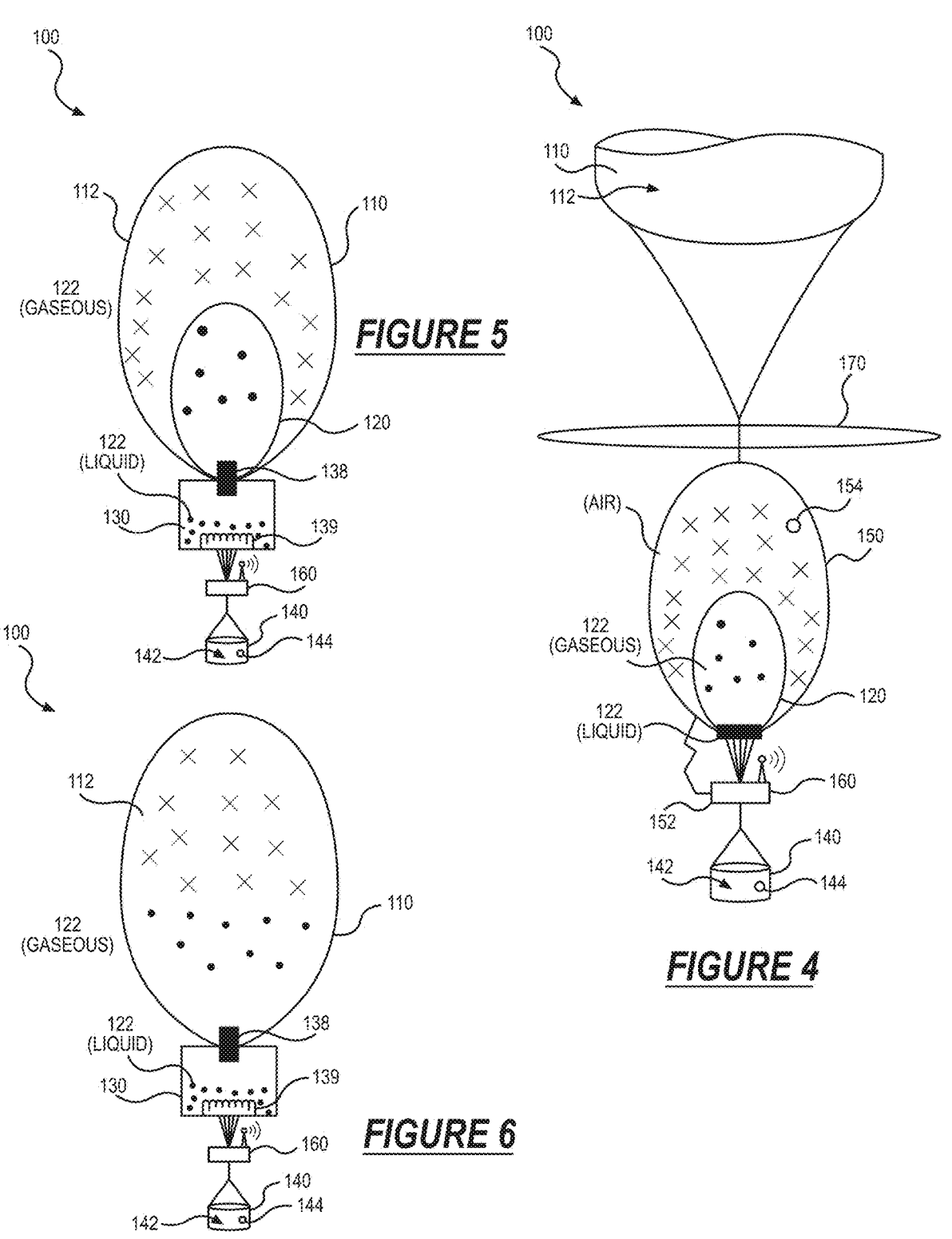
FIG. 4 is a schematic representation of one variation of the aerial vehicle.
FIG. 5 is a schematic representation of one variation of the aerial vehicle.
FIG. 6 is a schematic representation of one variation of the aerial vehicle.

In one variation shown in FIG. 5, the second inflatable element 120 is nested within the first inflatable element 110.

1.6 Aerial Vehicle: Single Inflatable Element

In another variation shown in FIG. 6, the aerial vehicle 100 includes: the first inflatable element 110; the first mass of lifting gas 112 (e.g., helium) arranged within the inflatable element and configured to generate aerostatic lift; and the second mass of volatile fluid 122 (e.g., butane, propane, isobutane, cyclopropane, ammonia, Dimethyl ether) arranged within the inflatable element and co-spatial with the first mass of lifting gas 112.

2. APPLICATIONS

Figure 8:
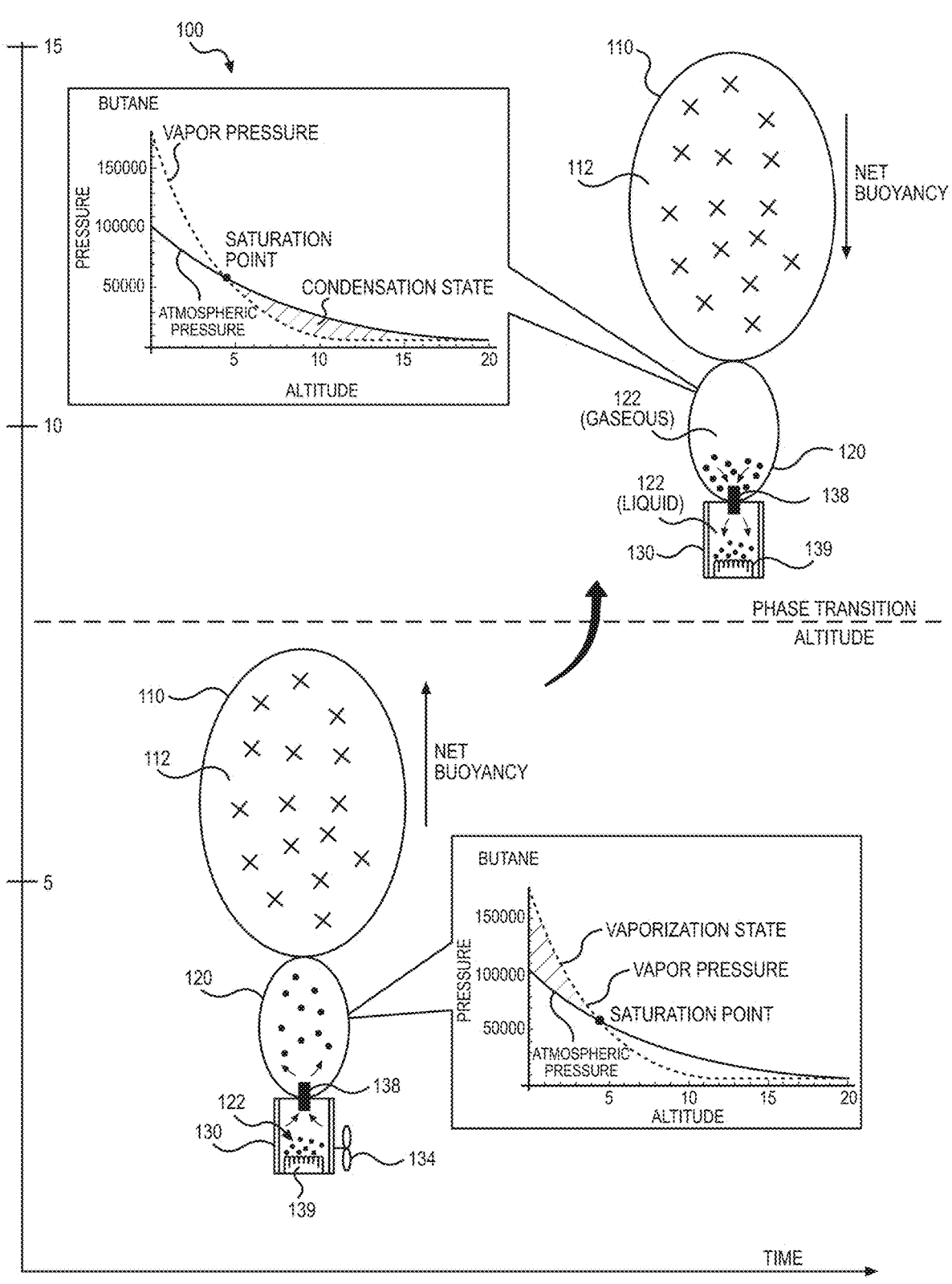
FIG. 8 is a flowchart representation of one variation of the aerial vehicle.

As shown in FIG. 8, the aerial vehicle 100 functions as a lighter-than-air unmanned weather balloon that can extract thermodynamic work from changes in ambient temperature and pressure during ascent and descent of the aerial vehicle 100 to induce transition (e.g., vaporization, condensation) of a volatile fluid 122 (e.g., butane, isobutane, methanol) between: a gaseous state that increases displacement of ambient air about the aerial vehicle 100 to passively increase net (i.e., total, aggregate) buoyancy of the aerial vehicle 100 without releasing any or as much ballast at the aerial vehicle 100; and a liquid state that decreases displacement of ambient air about the aerial vehicle 100 to passively decrease net buoyancy of the aerial vehicle 100 without venting any or as much lifting gas 112 (e.g., helium) at the aerial vehicle 100, thereby reducing ballast and lifting gas 112 consumption per macro oscillation of the aerial vehicle 100 across its operating altitude range, extending an operating period of the aerial vehicle 100, and/or enabling the aerial vehicle 100 to operate over similar time windows with less ballast and lifting gas 112 per payload unit mass.

In particular, the aerial vehicle 100 can include a mass of volatile fluid 122 (e.g., butane) characterized by a saturation-vapor-pressure curve. At any given latitude and longitude of the aerial vehicle 100, an altitude with an operational altitude range of the aerial vehicle 100 (e.g., 0-20 kilometers) may (or will) exhibit atmospheric pressure and atmospheric temperature equivalent to a pressure and temperature (or "saturation point") on the saturation-vapor-pressure curve of the volatile fluid 122. Thus, when the aerial vehicle 100 ascends past this "phase-transition altitude," the volatile fluid 122 may begin to condense, thereby reducing a volume of the second inflatable element 120, increasing the net buoyancy of the aerial vehicle 100, and reducing an ascension rate of the aerial vehicle 100. Conversely, when the aerial vehicle 100 descends past this "phase-transition altitude," the volatile fluid 122 may begin to evaporate, thereby increasing the volume of the second inflatable element 120, increasing the net buoyancy of the aerial vehicle 100, and decreasing a descension rate of the aerial vehicle 100.

Figure 11A:
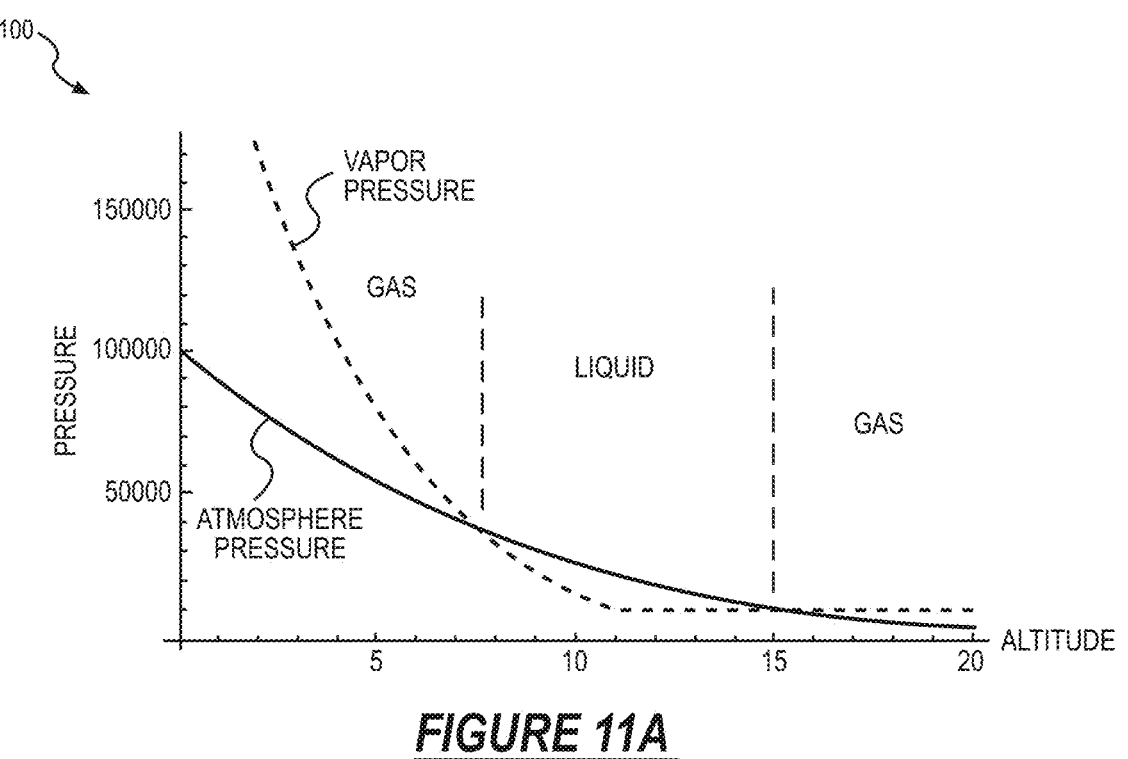
FIGS. 11A and 11B are graphical representation of a volatile fluid.
Figure 11B:
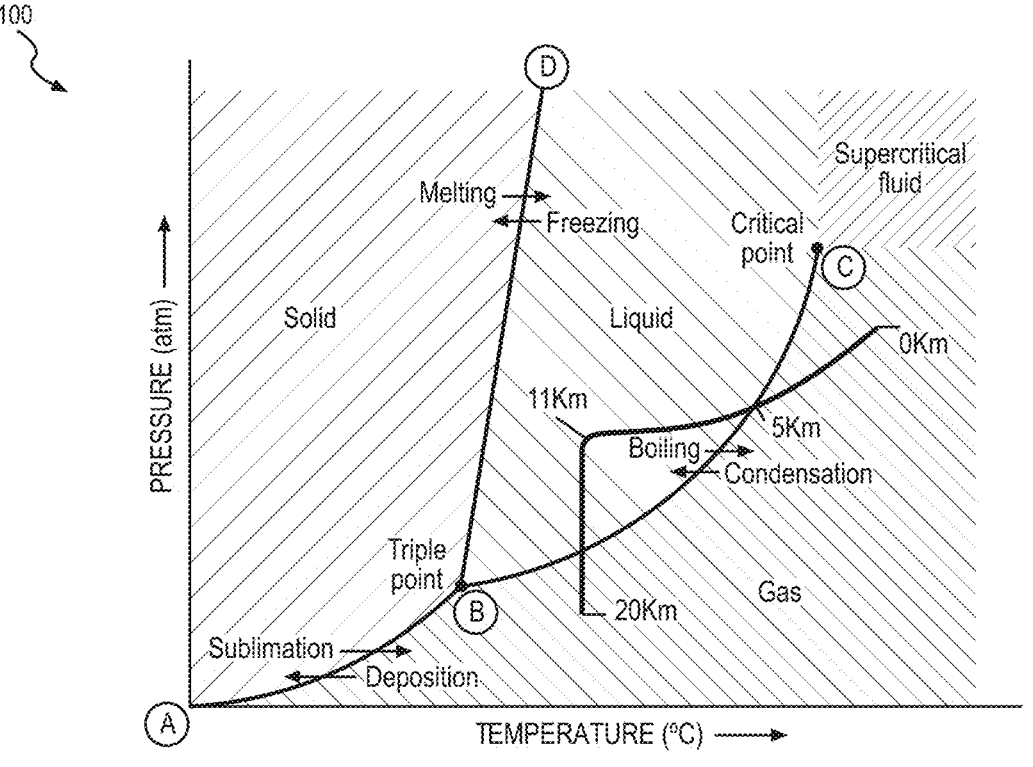

Therefore, the aerial vehicle 100 can include a mass of volatile fluid 122—characterized by a saturation-vapor-pressure curve that intersects atmospheric conditions at a phase-transition altitude within the operational altitude range of the aerial vehicle 100—such as butane, as shown in FIGS. 11A and 11B. The mass of volatile fluid 122 can thus transition between gaseous and liquid states responsive to natural local changes in atmospheric temperature and pressure around the aerial vehicle 100 as the aerial vehicle 100 ascends and descends within its operating altitude range. Accordingly, the volatile fluid 122 can automatically and passively slow a rate of ascent above the phase-transition altitude, thereby automatically reducing a peak altitude reached by the aerial vehicle 100 when above the phase-transition altitude without necessitating any or as much venting of lifting gas 112. Similarly, the volatile fluid 122 can automatically and passively slow a rate of descent below the phase-transition altitude, thereby automatically limiting a minimum altitude reached by the aerial vehicle 100 when below the phase-transition altitude without necessitating any or as much release of ballast.

2.1 Passive Ascent/Descent Transition via Phase Transition

Generally, the aerial vehicle 100 includes a first inflatable element 110; and a first mass of lifting gas 112 (e.g., helium) arranged within the first inflatable element 110 and configured to generate aerostatic lift. The aerial vehicle 100 also includes: a second inflatable element 120 arranged proximal the first inflatable element 110—such as arranged within or suspended below the first inflatable element 110—and a second mass of volatile fluid 122 (e.g., butane, isobutane) arranged within the second inflatable element 120. The second mass of volatile fluid 122 is characterized by a saturation-vapor-pressure curve that intersects an atmospheric temperature-pressure profile within an operational altitude range of the aerial vehicle 100.

As the aerial vehicle 100 ascends and descends within the atmosphere, ambient temperature and pressure vary with geographic location, altitude, and seasonal weather conditions. These naturally varying ambient conditions may intersect temperatures and pressures on the saturation-vapor-pressure curve of the second mass of volatile fluid 122 and thereby induce passive phase transition of the volatile fluid 122 between gaseous and liquid states. For example, at relatively low atmospheric altitudes exhibiting higher temperatures and higher pressures, the volatile fluid 122 remains in or transitions into the gaseous state, which expands the second inflatable element 120, increases displacement of ambient air by the aerial vehicle 100, and increases net buoyancy of the aerial vehicle 100. Conversely, at relatively high atmospheric altitudes exhibiting lower temperatures and lower pressures, the volatile fluid 122 transitions into the liquid state.

More specifically, during descent of the aerial vehicle 100 below a local phase-transition altitude—characterized by an ambient temperature and pressure approximating a saturation point on the saturation-vapor-pressure curve—the second mass of volatile fluid 122 vaporizes into the gaseous state within the second inflatable element 120, which increases a volume of the second inflatable element 120, increases displacement of ambient air around the second inflatable element 120, passively increases net buoyancy of the aerial vehicle 100, and slows or reverses descent of the aerial vehicle 100 without requiring release (or as much release) of ballast. During ascent of the aerial vehicle 100 above this phase-transition altitude, the second mass of volatile fluid 122 condenses into the liquid state within the second inflatable element 120, which decreases the volume of the second inflatable element 120, decreases displacement of ambient air, passively reduces net buoyancy of the aerial vehicle 100, and slows or reverses ascent of the aerial vehicle 100 without requiring venting (or as much venting) of the lifting gas 112.

Therefore, rather than releasing ballast to transition the aerial vehicle 100 from descent to ascent or venting lifting gas 112 to transition the aerial vehicle 100 from ascent to descent the aerial vehicle 100 can leverages passive cyclical phase transition of the second mass of volatile fluid 122 to compensate for variations in ambient temperature and pressure—encountered during flight—that otherwise cause a lifting gas-only balloon to continue descending at lower altitudes or continue ascending at higher altitudes. Accordingly, the second mass of volatile fluid 122 can passively transition between liquid and gaseous states, thereby modulating net buoyancy of the aerial vehicle 100 and enabling the aerial vehicle 100 to naturally oscillate within its operational altitude range and collect ambient (e.g., weather) data across this operational altitude range over longer time durations due to absence or reduction of lifting gas 112 and ballast venting to effect altitude changes.

2.2 Applications: Active Lift Control

Furthermore, the second mass of volatile fluid 122 transitions between the liquid state and the gaseous state over time as a function of thermal energy transfer into and out of the volatile fluid 122. The aerial vehicle 100 can reduce this phase-transition duration of the volatile fluid 122 and thus increase a rate of the net buoyancy increase of the aerial vehicle 100, such as by: activating a heating element 139 coupled to the second inflatable element 120 or condensate vessel 130; opening a vent 136 or activating a fan 134 coupled to a heatsink 132 arranged on the condensate vessel 130; or triggering a condensate valve 138 or pump 128 to pass liquid volatile fluid 122 through a nozzle 127 that atomizes the volatile fluid 122 within the second inflatable element 120, thereby increasing a rate of heat transfer into the volatile fluid 122.

For example, the aerial vehicle 100 can transition the second mass of volatile fluid 122 into the gaseous state (e.g., by activating the heating element 139) or increase a rate of heat transfer into the volatile fluid 122 in order to increase net buoyancy of the aerial vehicle 100—and thus reverse descent of the aerial vehicle 100 or increase the altitude of the aerial vehicle 100—in order to avoid a hazardous atmospheric zone below the aerial vehicle 100, such as storm or high wind condition predicted by the controller based on signals read from humidity, acoustic, or optical rain sensors and/or wind speed sensors arranged in aerial vehicle. Therefore, rather than releasing ballast to transition the aerial vehicle 100 from descent to ascent, the aerial vehicle 100 can actively induce phase transition of the second mass of volatile fluid 122 in order to control net buoyancy of the aerial vehicle 100 and thus execute controlled altitude changes of the aerial vehicle 100, such as according to a flight plan or responsive to local weather conditions.

2.3 Example

In one example, the first inflatable element 110 defines a maximum internal volume of approximately 800 cubic feet (22.7 m³) when fully expanded at a peak altitude within the operational altitude range of the aerial vehicle 100 (e.g., 14,000 feet (4.3 km)), defines a length of 60 feet (18.29 m), and defines a diameter of 4 feet (1.22 m). At sea level, the first inflatable element 110 is filled with approximately 4.2 pounds (1.9 kg) of helium, which fills approximately fifty percent of the maximum internal volume of the first inflatable element 110 and generates approximately 25 pounds (11 kg) of buoyancy at sea-level conditions.

In this example, the aerial vehicle 100 also includes 2 pounds (0.9 kg) of a ballast material 142 (e.g., sand) stored in a ballast vessel 140 suspended below the first inflatable element 110 and the second inflatable element 120. The aerial vehicle 100 also includes sensors, avionics, a controller 160, and other electronics arranged within a payload assembly suspended below the first inflatable element 110 and weighing approximately 8 ounces (0.23 kg).

In this example, the second inflatable element 120 is suspended from the first inflatable element 110 and coupled to a condensate vessel 130 loaded with approximately 12 ounces (0.75 lb, 0.34 kg) of butane (i.e., the volatile fluid 122). This second mass of volatile fluid 122 occupies approximately 35 cubic inches (0.57 liters) in the liquid state and approximately 5 cubic feet (0.14 m³) in the gaseous state, yielding a maximum change in buoyancy of approximately 0.37 pounds (0.17 kg) when the entire second mass of volatile fluid 122 is transitioned between the liquid state and the gaseous state. In normal operation, the controller 160 releases only a working portion of the second mass of volatile fluid 122 into the second inflatable element 120 during each ascent-descent cycle-such as approximately 6 ounces (0.38 lb, 0.17 kg)—and retains the remaining portion of the second mass of volatile fluid 122 in the condensate vessel 130 as a reserve.

Accordingly, in this example, the condensate vessel 130 defines an internal volume of approximately 36 cubic inches (0.59 liters) and can define a cylinder approximately 2.5 inches (65 mm) in diameter and 7 inches (180 mm) in height. The second inflatable element 120: defines a cylindrical geometry with pinched ends enclosing an internal volume of approximately 6 cubic feet (0.17 m³) when fully inflated; defines a length of 3.0 feet (0.91 m); defines a diameter of 18 inches (0.46 m); and weighs approximately 1.8 ounces (0.05 kg). The second inflatable element 120 also includes twelve pleats 121, each approximately 3.0 feet (0.91 m) in length and 0.3 feet (3.6 inches, 0.09 m) in depth, that cooperate to increase surface area of the second inflatable element 120 and thus increase rate of heat flux between the volatile fluid 122 and ambient air.

In this example, under common atmospheric conditions on a clear summer day over San Francisco, the phase-transition altitude of the volatile fluid 122 is approximately 7,500 feet (2.3 km), and the aerial vehicle 100 operates within an operational altitude range between approximately 3,000 feet (0.9 km) and 14,000 feet (4.3 km). The aerial vehicle 100 descends at a rate of approximately 3 feet per second as it crosses the phase-transition altitude. Once the aerial vehicle 100 descends to an altitude of approximately 5,500 feet (i.e., 2,000 feet below the phase-transition altitude), the aerial vehicle 100 opens a condensate valve 138 between the condensate vessel 130 and the second inflatable element 120, which releases the working portion of the volatile fluid 122—or approximately 6 ounces (0.38 lb)—from the condensate vessel 130 into the second inflatable element 120.

Given ambient temperature, pressure, and the material and geometry of the second inflatable element 120 that govern thermal energy transfer into the volatile fluid 122, approximately twenty-five percent (or 3 ounces) of the volatile fluid 122 over approximately 8 minutes as the aerial vehicle 100 continues to descend, which inflates the second inflatable element 120, increases net buoyancy of the aerial vehicle 100 by approximately 3 ounces (85 g), and slows the descent rate of the aerial vehicle 100 from approximately 3 feet per second to null. Vaporization of an additional volatile fluid 122 further increases the net buoyancy of the aerial vehicle 100, which then transitions from descent to ascent at a descent-ascent transition altitude of approximately 5,000 feet (1.5 km), or approximately 2,500 feet below the phase-transition altitude. An additional twenty-five percent (or 3 ounces) of the volatile fluid 122 vaporizes as the aerial vehicle 100 ascends from this descent-ascent transition altitude to the phase-transition altitude.

The aerial vehicle 100 then ascends across the phase-transition altitude at a rate of approximately 4 feet per second. As the aerial vehicle 100 rises above the phase-transition altitude, the volatile fluid 122 within the second inflatable element 120 condenses. Given ambient temperature, pressure, and the material and geometry of the second inflatable element 120, approximately sixty percent of the gaseous volatile fluid 122 in the second inflatable element 120 (or approximately 3.6 ounces of volatile fluid 122) condenses over approximately 15 minutes, which decreases the volume of the second inflatable element 120, decreases net buoyancy of the aerial vehicle 100 by approximately 4 ounces (110 g), and slows ascent of the aerial vehicle 100. The aerial vehicle 100 then transitions from ascent to descent at an ascent-descent transition altitude of approximately 10,000 feet (3.0 km), or approximately 2,500 feet above the phase-transition altitude. The remaining gaseous volatile fluid 122 in the second inflatable element 120 condenses as the aerial vehicle 100 descends from approximately 10,000 feet toward the phase-transition altitude.

Above the phase-transition altitude, the aerial vehicle 100 opens the condensate valve 138 between the second inflatable element 120 and the condensate vessel 130, which allows condensed volatile fluid 122 to flow back into the condensate vessel 130. The aerial vehicle 100 then: closes the condensate valve 138 when approaching—and before crossing—the phase-transition altitude; crosses the phase-transition altitude at approximately 3 feet per second; and repeats this cycle to achieve macro oscillations across the operational altitude range of the aerial vehicle without venting (as much) lifting gas 112 or releasing ballast material 142.

2.3.1 Nozzle

In this example and as shown in FIGS. 2 and 3, the aerial vehicle 100 can also include a nozzle 127 arranged between the condensate vessel 130 and the second inflatable element 120. By actively or passively forcing the liquid volatile fluid 122 through the nozzle 127 to atomize the volatile fluid 122, the aerial vehicle 100 increases surface area of the volatile fluid 122 within the second inflatable element 120 and decreases vaporization time of the volatile fluid 122, such as from approximately 8 minutes to approximately 3 minutes when below the phase-transition altitude. This reduction in vaporization time reduces the vertical distance the aerial vehicle 100 descends after release of volatile fluid 122 into the second inflatable element 120 from approximately 500 feet to approximately 200 feet and/or may increase the speed at which the aerial vehicle 100 crosses and ascends above the phase-transition altitude.

2.3.2 Heating Element

Additionally or alternatively, the aerial vehicle 100 can include a heating element 139 inline between the condensate vessel 130 and the second inflatable element 120 or immersed within the condensate vessel 130. In this example, after ascending above the phase-transition altitude, the aerial vehicle 100 delivers approximately 1,000 joules of thermal energy from a battery (e.g., rechargeable lithium-ion cell) into volatile fluid 122 flowing from the condensate vessel 130 into the second inflatable element 120, thereby: evaporating volatile fluid 122 or otherwise maintaining gaseous volatile fluid 122 within the second inflatable element 120; delaying reduction in net buoyancy of the aerial vehicle 100; and increasing the ascent-descent transition altitude, such as from 10,000 feet to 12,000 feet.

3. TERMS

Generally, a "volatile fluid 122" as referred to herein is a substance (e.g., butane, isobutane) or a mixture of substances characterized by a pressure-versus-temperature saturation-vapor-pressure curve that intersects a standard atmospheric profile (i.e., an atmospheric pressure-versus-temperature curve) within an operational altitude range of the aerial vehicle 100 (e.g., between approximately 3,000 feet (0.9 km) and 14,000 feet (4.3 km)). At altitudes along this intersection, the volatile fluid 122 transitions between the liquid state and the gaseous state as a function of local atmospheric temperature and pressure.

Generally, a "phase-transition altitude" as referred to herein is a local atmospheric zone in which an ambient temperature and an ambient pressure approximate a temperature and a pressure on the saturation-vapor-pressure curve of the volatile fluid 122. When crossing this phase-transition altitude, the volatile fluid 122 begins to transition between the liquid state and the gaseous state. The phase-transition altitude may vary with geographic location and local weather conditions.

4. AERIAL VEHICLE: BALLOON MODULE

Generally and as shown in FIG. 1, the aerial vehicle 100 includes: a first inflatable element 110 (or "balloon"; and a first mass of lifting gas 112 (e.g., helium) arranged within the first inflatable element 110 and configured to generate aerostatic lift. More specifically, the first inflatable element 110 (or "balloon") forms a primary lifting structure of the aerial vehicle 100. The first inflatable element 110 can be formed of a polymer film (e.g., linear low-density polyethylene, polyethylene terephthalate, mylar, chloroprene, latex) and is configured to contain a first mass of lifting gas 112 (e.g., helium) arranged. The first mass of lifting gas 112—contained in the first inflatable element 110—induces aerostatic lift, increases net buoyancy of the aerial vehicle 100, and thus lifts the aerial vehicle 100.

The aerial vehicle 100 can also include: a lifting gas vent 114 coupled to the first inflatable element 110 and configured to vent lifting gas 112 from the first inflatable element 110 to decrease the net buoyancy of the aerial vehicle 100; a ballast vessel 140 suspended from the first inflatable element 110 and/or the second inflatable element 120; a third mass of a ballast material 142 (e.g., sand) contained within the ballast vessel 140; and a ballast valve 144 coupled to ballast vessel 140 and configured to release ballast material 142 from the ballast vessel 140 to increase the net buoyancy of the aerial vehicle 100.

In one implementation, the first inflatable element 110 is partially filled with the first mass of lifting gas 112 at sea-level atmospheric conditions and is therefore free to expand elastically as the aerial vehicle 100 ascends within the atmosphere. The first inflatable element 110 is fully expanded by the first mass of lifting gas 112—at a peak altitude of the aerial vehicle 100 (e.g., 14,000 feet (4.3 km)) in the operational altitude range of the aerial vehicle 100—due to differences in ambient atmospheric pressure and temperature conditions between sea level and this peak altitude, which may result in increasing net buoyancy of the aerial vehicle 100 as the aerial vehicle 100 approaches this peak altitude.

Therefore, during operation, the controller 160 can selectively trigger the lifting gas vent 114 to release a portion of the lifting gas 112 from the first inflatable element 110 in order to reduce net buoyancy of the aerial vehicle 100 and induce descent of the aerial vehicle 100 as the aerial vehicle 100 approaches or crosses this peak altitude.

Similarly, during ascent of the aerial vehicle 100 toward its minimum operating altitude, the controller 160 can trigger the ballast valve 144 to release ballast, thereby increasing the net buoyancy of the aerial vehicle 100 and causing the aerial vehicle 100 to slow or reverse its descent.

5. VOLATILE FLUID

Generally, the second mass of a volatile fluid 122: is contained within the second inflatable element 120 and/or the condensate vessel 130 (i.e., dependent on a state of the volatile fluid 122); is characterized by a saturation-vapor-pressure curve that intersects an atmospheric temperature-pressure profile within an operational altitude range of the aerial vehicle 100; is configured to condense during an ascent of the aerial vehicle 100 across a phase-transition altitude, in the operational altitude range, thereby reducing the volume of ambient air displaced by the second inflatable element 120 and passively reducing a net buoyancy of the aerial vehicle 100; and is configured to vaporize during an decent of the aerial vehicle 100 across the phase-transition altitude, thereby increasing the volume of ambient air displaced by the second inflatable element 120 and passively increasing the net buoyancy of the aerial vehicle 100

In particular and as shown in FIGS. 11A and 11B, the volatile fluid 122 is characterized by a saturation-vapor-pressure curve defining combinations of pressure and temperature at which the volatile fluid 122 transitions between a condensed (or "liquid") state and a vaporized (or "gaseous") state. Accordingly, the volatile fluid 122 is selected for its saturation-vapor-pressure curve, which intersects an atmospheric temperature-pressure profile within the operational altitude range of the aerial vehicle 100 (e.g., between 3,000 feet (0.9 km) and 14,000 feet (4.3 km)). For example, the volatile fluid 122 can include butane, isobutane, dimethyl ether, sulfur dioxide, and/or ammonia. More specifically, the volatile fluid 122 can (solely) include butane, which exhibits a saturation-vapor-pressure curve that yields a phase-transition altitude of approximately 7,500 feet (2.3 km) under common atmospheric conditions such that the volatile fluid 122 begins to vaporize when the aerial vehicle 100 descends below this phase-transition altitude and begins to condense when the aerial vehicle 100 ascends above this phase-transition altitude, thereby balancing or offsetting changes in lift by the lifting gas 112 at the aerial vehicle 100 moves within it operational altitude range.

5.1 Combination of Volatile Fluids

In one variation, the volatile fluid 122 includes a mixture of volatile compounds (e.g., butane, isobutane, dimethyl ether, sulfur dioxide, cyclopropane, ammonia, propane, and/or propyne), each characterized by a different saturation-vapor-pressure curve. This mixture of volatile compounds can smooth transition of the volatile fluid 122 between the liquid state and the gaseous state across a wider phase-transition altitude band. More specifically, each volatile compound in this mixture can contribute to total vapor pressure within the second inflatable element 120. As the aerial vehicle 100 ascends from a minimum altitude to a maximum altitude, separate partial condensation of each volatile compound at different altitudes therebetween can: yield slower condensation of the entire volatile mixture; smooth a rate of the net buoyancy reduction of the aerial vehicle 100 as the aerial vehicle 100 ascends; enable the aerial vehicle 100 to reach a higher peak altitude before reversing direction; and or avoid runaway ascent of the aerial vehicle 100 due to the aerial vehicle 100 passing a second, higher phase-transition altitude in which a single compound (e.g., butane) in this volatile mixture may transition back into gas. More specifically, partial phase transitions by different compounds across different saturation-vapor-pressure curves may widen the phase-transition altitude band and yield a more gradual decrease in net buoyancy at the aerial vehicle 100; and vice versa during descent of the aerial vehicle 100.

In one example, two similar aerial vehicles are filled with different volatile fluids or volatile mixtures tuned for different nominal phase-transition altitudes that enable these aerial vehicles to passively oscillate within different operating altitude ranges while traversing similar paths or locations around the Earth. In this example, a first aerial vehicle—configured to operate within a first operational altitude range between 3,000 and 14,000 feet—is loaded with a first volatile fluid 122 of 99+% butane, which is characterized by a saturation-vapor-pressure curve that intersects the atmospheric temperature-pressure profile between 6,000 feet and 9,000 feet. A second aerial vehicle—configured to operate within a second operational altitude range between 10,000 and 20,000 feet)—is loaded with a volatile mixture of 60 percent butane and 40 percent isobutane, which in aggregate yield a second saturation-vapor-pressure curve that intersects the atmospheric temperature-pressure profile between approximately 10,000 feet and 15,000 feet.

In another example, two similar aerial vehicles are filled with different volatile fluids or volatile mixtures tuned to enable these aerial vehicles to passively oscillate within the same operating altitude range while navigating different latitude bands around the Earth. In this example, a first aerial vehicle—configured to operate within lower-latitude (e.g., warmer) zones (e.g., −45° to +45°)—is loaded with a first volatile fluid 122 of 99+% butane, which is characterized by a saturation-vapor-pressure curve that intersects the atmospheric temperature-pressure profile between 6,000 feet and 9,000 feet within these warmer, lower-latitude zones. A second aerial vehicle—configured to operate within higher-latitude (e.g., colder) zones (e.g., +45° to +90° and −45° to −90°)—is loaded with a volatile mixture of 70 percent butane and 30 percent isobutane, which in aggregate yield a second saturation-vapor-pressure curve that intersects the atmospheric temperature-pressure profile within these colder, higher-latitude zones.

6. EXTERNAL SECOND INFLATABLE ELEMENT

Generally and as shown in FIGS. 1-4, the second inflatable element 120 is arranged outside of and below the first inflatable element 110. In particular, the second inflatable element 120 is suspended from the first inflatable element 110 and directly exchanges thermal energy with ambient air to condense and vaporize the volatile fluid 122 contained therein when the aerial vehicle 100 is above and below the phase-transition altitude, respectively. More specifically, because the second inflatable element 120 is located outside of the first inflatable element 110, volatile fluid 122 located in the second inflatable element 120 is minimally insulated from ambient air and may therefore exhibit greatest passive evaporation and condensation rates within the second inflatable element 120 when the aerial vehicle 100 occupies altitude below and above the phase-transition altitude.

6.1 Material

The second inflatable element 120 is formed of a polymer film compatible with the volatile fluid 122, capable of sustaining repeated elastic expansion and contraction cycles during phase transitions of the volatile fluid 122, and exhibiting low permeability to the volatile fluid 122. For example, the second inflatable element 120 can be formed of linear low-density polyethylene, polyethylene terephthalate, or mylar.

6.2 Geometry

Generally, the second inflatable element 120 is configured to elastically expand and thus increase displacement of ambient air as the volatile fluid 122 vaporizes; and vice versa. Alternatively, the second inflatable element 120 can include an oversized zero-pressure balloon.

For example, the second inflatable element 120 can define: a prolate spheroidal geometry; or a cylindrical geometry, such as with pinched or "necked" ends coupled to the first inflatable element 110 above and the ballast vessel 140 below.

The second inflatable element 120 can also include a set of pleats 121 configured: to present an expanded exterior surface area of the second inflatable element 120 to ambient air; and to promote transfer of thermal energy between ambient air and the volatile fluid 122. More specifically, the second inflatable element 120 can include a set of pleats 121 that increase the surface area of the second inflatable element 120. Rates of evaporation and condensation of the volatile fluid 122 within the second inflatable element 120 are proportional to a rate of heat transfer between ambient air and the volatile fluid 122, which may be proportional to the surface area of the second inflatable element 120. Therefore, the set of pleats 121 can increase condensation and evaporation rates of volatile fluid 122 occupying the second inflatable element 120.

7. PASSIVE LIFT

In one implementation shown in FIG. 1, the second mass of volatile fluid 122 is sealed within the second inflatable element 120 and transitions between the liquid state and the gaseous state solely in response to changes in local atmospheric temperature and pressure conditions, such as resulting from ascent and descent of the aerial vehicle 100.

In particular, as the aerial vehicle 100 ascends, ambient temperature and pressure around the aerial vehicle 100 decrease, which allows the first mass of lifting gas 112 to expand, which expands the first inflatable element 110, increases displacement of ambient air by the first inflatable element 110, and increases a lifting-gas-component of the net buoyancy of the aerial vehicle 100. Above the local phase-transition altitude, the volatile fluid 122 within the second inflatable element 120 begins to condense, which reduces the volume of the second inflatable element 120, reduces the volume of ambient air displaced by the second inflatable element 120, reduces a volatile-fluid component of the net buoyancy of the aerial vehicle 100, and balances or complements increases in the lifting-gas-component of the net buoyancy of the aerial vehicle 100 at higher altitudes. Therefore, rather than the aerial vehicle 100 venting (as much) lifting gas 112 to reduce net buoyancy above the phase-transition altitude, the volatile fluid 122 naturally and passively condenses as the aerial vehicle 100 ascends above the phase-transition altitude, which reduces net buoyancy of the aerial vehicle 100 and slows ascent and/or induces descent.

Similarly, as the aerial vehicle 100 descends, ambient temperature and pressure around the aerial vehicle 100 increase, which compresses the first mass of lifting gas 112, contracts the first inflatable element 110, decreases displacement of ambient air by the first inflatable element 110, and reduces the lifting-gas-component of the net buoyancy of the aerial vehicle 100. Below the local phase-transition altitude, the volatile fluid 122 within the second inflatable element 120 begins to vaporize, which increases the volume of the second inflatable element 120, increases the volume of ambient air displaced by the second inflatable element 120, increases a volatile-fluid component of the net buoyancy of the aerial vehicle 100, and balances or complements decreases in the lifting-gas-component of the net buoyancy of the aerial vehicle 100 at lower altitudes. Therefore, rather than the aerial vehicle 100 venting (as much) ballast to increase net buoyancy below the phase-transition altitude, the volatile fluid 122 naturally and passively vaporizes as the aerial vehicle 100 descends below the phase-transition altitude, which increases net buoyancy of the aerial vehicle 100 and slows descent and/or induces ascent.

Therefore, the volatile fluid 122—sealed within the second inflatable element 120—can reduce or eliminate a need to vent lifting gas 112 or release ballast to drive transitions between descent and ascent above and below the phase-transition altitude and thus enable the aerial vehicle 100 to passively maintain an oscillating flight path within its operational altitude range.

7.1 Evaporation-Rate Controls: Sump+Valves+Nozzle

In one variation shown in FIG. 3, the second inflatable element 120: defines a closed bottom that forms a sump 123; includes a film 124 arranged over and enclosing the sump 123; and is configured to funnel liquid volatile fluid 122 toward the sump 123. In this implementation, the aerial vehicle 100 further includes: a passive check valve 125 arranged on the film 124 and configured to pass liquid volatile fluid 122 into the sump 123 while preventing backflow of the volatile fluid 122 out of the sump 123; an active valve 126; and a nozzle 127 (e.g., a solid cone nozzle 127). The active valve 126: is coupled to the sump 123; is operable in a closed position to retain the volatile fluid 122 within the sump 123 and limit an increase in net buoyancy of the aerial vehicle 100 during descent below the phase-transition altitude; and is operable in an open position to supply volatile fluid 122 from the sump 123 to the nozzle 127. The nozzle 127: is arranged within the second inflatable element 120; is coupled to the active valve 126; and is configured to atomize liquid volatile fluid 122 expanding from the sump 123, through the active valve 126, and into the nozzle 127 in response to the active valve 126 transitioning from the closed position to the open position.

Accordingly, the sump 123, the check valve 125, the active valve 126, and the nozzle 127 cooperate: to constrain liquid volatile fluid 122 in the sump 123, thereby preventing evaporation of the volatile fluid 122 into the second inflatable element 120 and prevent increase in the volatile fluid 122—component of the net buoyancy of the aerial vehicle 100 when operating below the phase-transition altitude; and to spray atomized liquid volatile fluid 122—under increased vapor pressure in the sump 123 when the aerial vehicle 100 is below the phase-transition altitude—to achieve rapid evaporation of the volatile fluid 122 into the second inflatable element 120 and thus rapidly increase the volatile fluid 122—component of the net buoyancy of the aerial vehicle 100 when operating below the phase-transition altitude.

In particular, the sump 123, the check valve 125, and the active valve 126 cooperate to collect and contain liquid volatile fluid 122 at the bottom of the second inflatable element 120. The active valve 126 selectively releases liquid volatile fluid 122 from the sump 123 through the nozzle 127 to atomize the volatile fluid 122. For example, the sump 123 can be formed by the bottom of the second inflatable element 120; and a thin polymer film 124 can be bonded (e.g., seam-sealed) to the interior surface of the second inflatable element 120 to enclose the sump 123. The nozzle 127 can be arranged inside of the second inflatable element 120, such as on or above this thin polymer film 124. A sump tube (e.g., a silicone rubber tube or line) can couple the bottom of the sump 123 to the nozzle 127. Alternatively, the thin polymer film 124 can form a neck extending upward from the sump 123, bonded to the interior surface of the second inflatable element 120, and coupled directly to the nozzle 127. The passive check valve 125 can be arranged on the thin polymer film 124 and can pass liquid volatile fluid 122 collecting above the film 124 into the sump 123 while preventing backflow of liquid volatile fluid 122 out of the sump 123. The active valve 126 can include a small electromechanical valve—such as a peristaltic pinch valve—arranged in or on the sump tube or neck. The active valve 126 can be normally closed and momentarily opened when triggered by the controller 160.

In this implementation, descent of the aerial vehicle 100 below the local phase-transition altitude—and exposure to solar heating and warmer ambient air—can increase vapor pressure of the volatile fluid 122 contained within the sump 123 while the active valve 126 is closed. While the active valve 126 is closed, little or no evaporation of volatile fluid 122 occurs within the second inflatable element 120, and the volatile fluid 122 contributes little or no increase in net buoyancy of the aerial vehicle 100.

When the controller 160 triggers the active valve 126 to open, volatile fluid 122 expands through the nozzle 127 due to increased vapor pressure within the sump 123. The nozzle 127 atomizes this volatile fluid 122 entering the upper region of the second inflatable element 120, which: yields a high rate of heat transfer from ambient air—via the second inflatable element 120—into the volatile fluid 122; yields a high rate of evaporation of the volatile fluid 122; and rapidly increases the net buoyancy of the aerial vehicle 100. The controller 160 can also: hold the active valve 126 open for a duration sufficient for vapor pressure within the second inflatable element 120 to equilibrate; or trigger the active valve 126 to close after a duration of time sufficient to release only a smaller subvolume of the volatile fluid 122 into the upper region of the second inflatable element 120, thereby controlling total change in net buoyancy of the aerial vehicle 100 resulting from evaporation of the volatile fluid 122.

7.2 Evaporation-Rate Controls: Pump

In a similar variation shown in FIG. 10, the aerial vehicle 100 includes a pump 128 coupled to the second inflatable element 120 and configured to pump liquid volatile fluid 122 from the sump 123 into the upper volume of the second inflatable element 120 or other the interior surface of the second inflatable element 120—such as through a nozzle 127 as described above—in order to: increase a rate of heat transfer from ambient air into the volatile fluid 122; increase an evaporation rate of the volatile fluid 122; and increase a rate of net buoyancy increase of the aerial vehicle 100 below the phase-transition altitude. For example, the pump 128 can include a small peristaltic pump arranged within the second inflatable element 120 and fluidly coupled to the sump 123 and the nozzle 127.

However, the aerial vehicle 100 can incorporate any other element and implement any evaporation-rate controls to increase heat transfer from ambient air into volatile fluid 122 sealed within the second inflatable element 120—such as selective actuation of the active valve 126 and the pump 128 to control a volume of volatile fluid 122 released from the sump 123 into the upper region of the second inflatable element 120 and thus a rate of evaporation of this volatile fluid 122 and therefore a rate of net buoyancy increase of the aerial vehicle 100.

8. CONDENSATE VESSEL+VALVE+NOZZLE+ HEATSINK+HEATING ELEMENT

In another variation shown in FIGS. 2, 8 and 10, the aerial vehicle 100 includes: a condensate vessel 130 fluidly coupled to (e.g., suspended from a bottom of) the second inflatable element 120; and a condensate valve 138 interposed between the second inflatable element 120 and the condensate vessel 130. The condensate valve 138 is: operable in a closed position to retain volatile fluid 122 within the condensate vessel 130 (i.e., prevent release of the volatile fluid 122 into the second inflatable element 120) and thus limit an increase in the volatile fluid 122 component of the net buoyancy of the aerial vehicle 100, such as during descent of the aerial vehicle 100 below the phase-transition altitude; and operable in an open position to release volatile fluid 122 from the condensate vessel 130 into the second inflatable element 120, thereby increasing the volatile fluid 122 component of the net buoyancy of the aerial vehicle 100 when the aerial vehicle 100 is below the phase-transition altitude.

For example, the condensate vessel 130 can include a flexible or rigid polymer bag, pouch, or container suspended below the second inflatable element 120. A sump tube (e.g., a silicone rubber tube or line) can run from a bottom of the condensate vessel 130 to the bottom of the second inflatable element 120. The condensate valve 138: can include a small electromechanical condensate valve 138—such as peristaltic pinch valve-arranged in or on the sump tube. The condensate valve 138 can be normally closed and momentarily opened when triggered by the controller 160.

In this variation, the aerial vehicle 100 further includes a nozzle 127: arranged within the second inflatable element 120; fluidly coupled to the condensate vessel 130 (e.g., arranged on an upper end of the sump tube); and configured to atomize liquid volatile fluid 122 expanding from the condensate vessel 130, through the condensate valve 138, and into the nozzle 127 in response to the condensate valve 138 transitioning from the closed position to the open position.

When the aerial vehicle 100 is located above the local phase-transition altitude, the volatile fluid 122 condenses and collects as liquid at the bottom of the second inflatable element 120. The controller 160 can trigger the condensate valve 138 to open to enable this liquid volatile fluid 122 to return to the condensate vessel 130. The volatile fluid 122 can thus flow (through the nozzle 127,) through the condensate valve 138 and into the condensate vessel 130.

In this implementation, the aerial vehicle 100 can implement evaporation-rate controls similar to those described above to selectively actuate the condensate valve 138 to control both: when the volatile fluid 122 is released into the second inflatable element 120; a volume of volatile fluid 122 released into the second inflatable element 120 and contributing to increase in the net buoyancy of the aerial vehicle 100; and a rate of evaporation of the volatile fluid 122.

8.1 Heatsink+Fan

In this variation and as shown in FIG. 7, the aerial vehicle 100 can further include: a heatsink 132 coupled to the condensate vessel 130; and a fan 134 configured to direct ambient air across the heatsink 132. In this variation, controller 160 can: activate the fan 134 during descent of the aerial vehicle 100 when below the phase-transition altitude in order to: accelerate transfer of thermal energy from ambient air into liquid volatile fluid 122 occupying the condensate vessel 130; increase an evaporation rate of the volatile fluid 122; and thus increase a rate of net buoyancy increase of the aerial vehicle 100 when below the phase-transition altitude.

For example, the heatsink 132: can be formed of a thermally conductive material (e.g., aluminum, copper) fastened to, bonded to, or integrated into a wall of the condensate vessel 130; and can include a set of vanes.

The fan 134 can be arranged on the condensate vessel 130 adjacent the heatsink 132 and can active drive ambient air across or through the heatsink 132 when activated, thereby further accelerating transfer of thermal energy from ambient air into liquid volatile fluid 122 occupying the condensate vessel 130. In this implementation, the fan 134 can also be configured to direct ambient air across the second inflatable element 120. Accordingly, the controller 160 can activate the fan 134 during ascent of the aerial vehicle 100 above the first phase-transition altitude in order to accelerate transfer of thermal energy from gaseous volatile fluid 122—occupying the second inflatable element 120—into ambient air, thereby increasing a condensation rate of the volatile fluid 122 and increasing a rate of net buoyancy reduction of the aerial vehicle 100 above the first phase-transition altitude.

The aerial vehicle 100 can additionally or alternatively include: a vent 136 arranged across an opening of the heatsink 132; operable in an open position and a closed position. In the open position, the vent 136 enables ambient air to flow through the heatsink 132, which increases a rate of heat transfer into the volatile fluid 122 occupying the condensate vessel 130 and thus increases a rate of increase in net buoyancy of the aerial vehicle 100 when below the phase-transition altitude. Conversely, in the closed position, the vent 136 reduces ambient air flow through the heatsink 132, which decreases the rate of heat transfer into the volatile fluid 122 occupying the condensate vessel 130 and thus decreases a rate of increase in net buoyancy of the aerial vehicle 100 when below the phase-transition altitude. The vent 136 can similarly yield increased and decreased rates of heat transfer from the volatile fluid 122 into ambient air in the open position and closed position, respectively, when the aerial vehicle 100 is above the phase-transition altitude.

8.2 Heating Element

In another variation shown in FIGS. 2, 7 and 8, the aerial vehicle 100 further includes a heating element 139: coupled to the condensate vessel 130; and configured to heat liquid volatile fluid 122 occupying the condensate vessel 130 in order to increase an evaporation rate of the volatile fluid 122 and thus increase a rate of net buoyancy increase of the aerial vehicle 100, such as at any altitude of the aerial vehicle 100.

For example, the heating element 139 can include a resistive immersion heating element 139 immersed in volatile fluid 122 occupying the condensate vessel 130. Alternatively, the heating element 139 can include an inline resistive heater: integrated into or arranged on the sump tube interposed between the condensate vessel 130 and the second inflatable element 120; and configured to (predominantly) heat volatile fluid 122 flowing from the condensate vessel 130 into the second inflatable element 120. (Furthermore, because the condensate vessel 130 and the sump tube do not contain free oxygen or a free oxidizer, operation of the heating element 139 may not induce combustion of the volatile fluid 122.)

In this variation, the aerial vehicle 100 can also include: a rechargeable battery; a solar panel and a recharging circuit configured to recharge the battery; and a switch (e.g., a transistor) configured to selectively supply electrical current from the rechargeable battery to the heating element 139, such as when triggered by the controller 160.

In this variation, by actively heating the volatile fluid 122 when the aerial vehicle 100 is below the phase-transition altitude, the controller 160 increases a vaporization rate of the volatile fluid 122 and thus increases a rate of net buoyancy increase of the aerial vehicle 100 when the aerial vehicle 100 is below the phase-transition altitude. Similarly, by actively heating the volatile fluid 122 when the aerial vehicle 100 is above the phase-transition altitude, the controller 160 decreases a condensation rate of the volatile fluid 122 and thus decreases a rate of net buoyancy decrease when the aerial vehicle 100 is above the phase-transition altitude.

In the foregoing implementations, the controller 160 can also: activate the heating element 139 to heat liquid volatile fluid 122 in the condensate vessel 130—while the condensate valve 138 is closed—in order to increase a vapor pressure within the condensate vessel 130; and then trigger the condensate valve 138 to open, thereby allowing the warmed volatile fluid 122 to expand into the second inflatable element 120. Accordingly, the heating element 139 and the condensate valve 138 can cooperate to pump volatile fluid 122 from the condensate vessel 130 into the second inflatable element 120.

8.3 Pressurized Condensate Vessel and Energy Recovery

Generally, the condensate vessel 130 defines a pressure vessel configured to store the second mass of volatile fluid 122—in the liquid state—at pressures exceeding ambient pressure across the operational altitude range of the aerial vehicle 100 such that the volatile fluid 122 continues to function as ballast independent of local ambient pressures and temps.

In one variation, the aerial vehicle 100 can further include: a turbine facing the nozzle 127; an electric generator (or dynamo) coupled to the turbine; and an onboard battery and battery charger coupled to the electric generator. Thus, when the controller 160 triggers the condensate valve 138 to open, the volatile fluid 122 expands from the condensate vessel 130, through the nozzle 127, passed the turbine, and into the second inflatable element 120 via the nozzle 127, thereby: increasing net buoyancy of the aerial vehicle 100; and driving the electric generator to output current to charge the onboard battery.

9. ACTIVE CONTROLS

Figure 9:
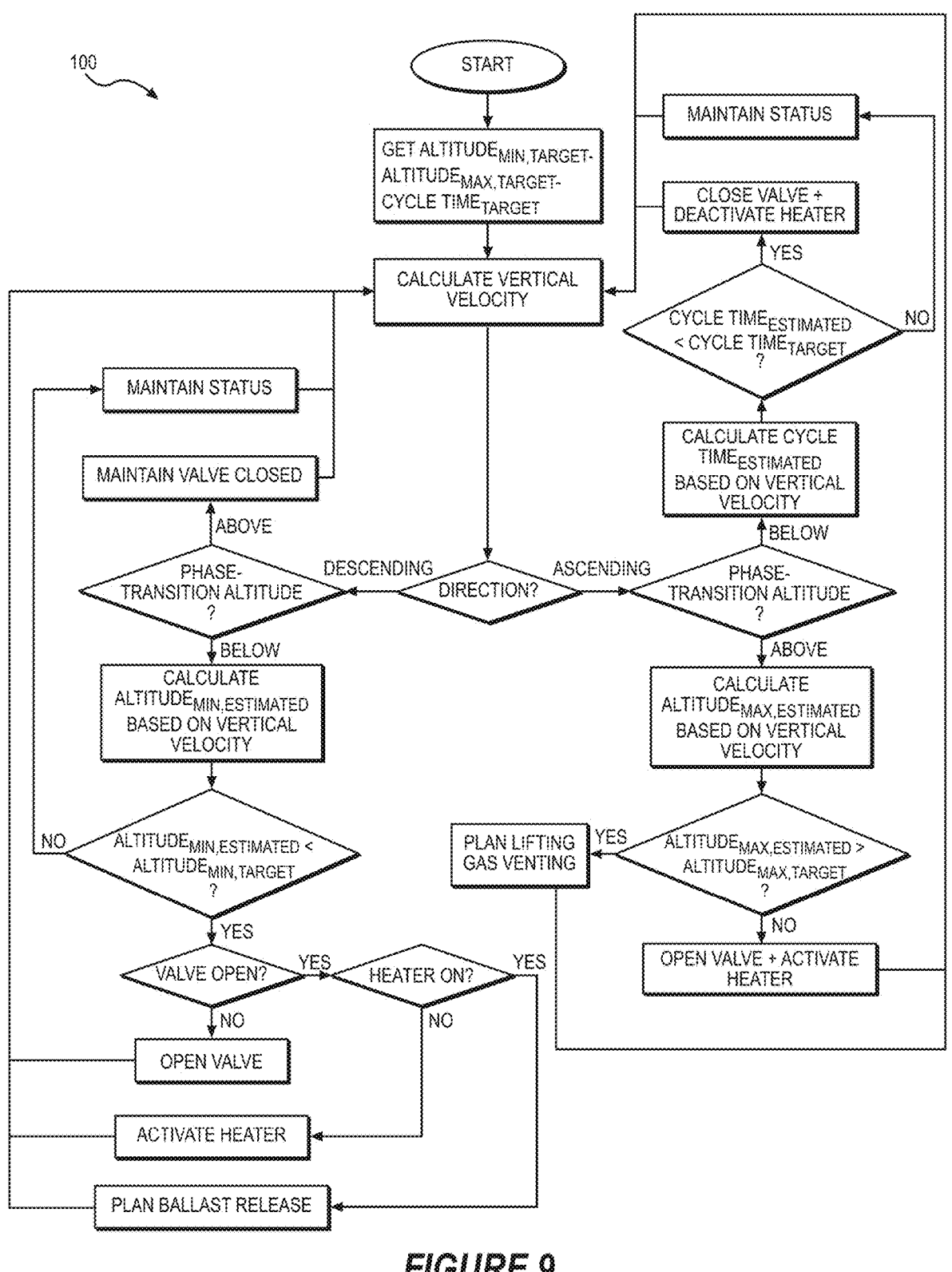
FIG. 9 is a flowchart representation of one variation of the aerial vehicle.

Generally and as shown in FIG. 9, the controller 160 can: access a flight plan (e.g., target altitudes at target times, hard and soft altitude bounds or limits); collect raw telemetry data via integrated or connected sensors, such as geospatial location and altitude; and track its vertical velocity and/or vertical acceleration based on these telemetry data. The controller 160 can then selectively activate or actuate the heating element 139, one or more valves 126, 138, the fan 134, the lifting gas vent 114, and/or the ballast valve 144, etc. in order: to modify net buoyancy of the aerial vehicle 100; to shape times and altitudes of ascent and transitions; and to realize or better approximate the flight plan.

In particular, the controller 160 can selectively activate or actuate the heating element 139, one or more valves 126, 138, the fan 134, the lifting gas vent 114, and/or the ballast valve 144, etc. in order: to effect a transition between ascent and descent; to control maximum and minimum altitudes reached by the aerial vehicle 100 during one macro oscillation with the operational altitude range of the aerial vehicle 100; to control vertical acceleration and velocity of the aerial vehicle 100; and to control total cycle time between minimal and maximum altitudes within one macro oscillation.

9.1 Directional Control

In one implementation, the controller 160 can control (or "influence," induce) ascent of the aerial vehicle 100 by implementing methods and techniques described above to release volatile fluid 122 into the second inflatable element 120 (or into the region of the second inflatable element 120 above the sump 123) as the aerial vehicle 100 descends below the phase-transition altitude, thereby allowing this volatile fluid 122 to vaporize within the second inflatable element 120, expanding the second inflatable element 120, increasing the net buoyancy of the aerial vehicle 100, and reversing descent of the aerial vehicle 100.

9.2 Minimum and Maximum Altitude Controls

Additionally or alternatively, the controller 160 can control (or "influence") minimum and maximum altitudes reached by the aerial vehicle 100 during a macro oscillation by adjusting timing and volume of volatile-fluid released into the second inflatable element 120—such as in addition to or instead of venting lifting gas 112 or ballast.

In particular, because evaporation of the volatile fluid 122 is not instantaneous once the aerial vehicle 100 descends below the phase-transition altitude, the controller 160 can reduce the minimum altitude reached by the aerial vehicle 100 by delaying release of volatile fluid 122 into the second inflatable element 120; and vice versa. In one example in which ambient conditions and the descent speed of the aerial vehicle 100 result in the aerial vehicle 100 descending 1,000 feet over a duration of time necessary to increase the buoyancy of the aerial vehicle 100—via volatile fluid 122 evaporation—by an amount necessary to reverse the direction of the aerial vehicle 100, the controller 160 can: realize a descent-ascent transition altitude of approximately 6,500 feet by releasing volatile fluid 122 into the second inflatable element 120 upon crossing a 7,500-foot phase-transition altitude; and realize a descent-ascent transition altitude of approximately 5,000 feet by releasing volatile fluid 122 into the second inflatable element 120 only upon reaching 6,000 feet.

In a similar example, during descent of the aerial vehicle 100 below the phase-transition altitude, the controller 160 can: calculate a descent rate of the aerial vehicle 100; access a target minimum altitude, below the phase-transition altitude, specified in the flight plan for the aerial vehicle 100; and calculate an estimated descent-ascent transition altitude of the aerial vehicle 100 based on the descent rate. Then, in response to the estimated descent-ascent transition altitude falling below the target minimum altitude, the controller 160 can activate the heating element 139: to heat liquid volatile fluid 122 occupying the condensate vessel 130; to increase the evaporation rate of liquid volatile fluid 122 occupying the condensate vessel 130; to increase the rate of net buoyancy increase of the aerial vehicle 100; and to transition the aerial vehicle 100, from descent to ascent, above the estimated descent-ascent transition altitude.

Similarly, because condensation of the volatile fluid 122 is not instanteous once the aerial vehicle 100 ascends above the phase-transition altitude, the controller 160 can increase the maximum altitude reached by the aerial vehicle 100 by vaporizing a larger mass of volatile fluid 122 in the second inflatable element 120 before crossing the phase-transition altitude; and vice versa. For example, after transitioning to ascent at the descent-ascent transition altitude, the aerial vehicle 100 can continue to release volatile fluid 122 into the second inflatable element 120 and/or activate the heating element 139 to heat and vaporization liquid volatile fluid 122, thereby increasing a ratio of gaseous to liquid volatile fluid 122 in the aerial vehicle 100. Once the aerial vehicle 100 crosses the phase-transition altitude, the gaseous volatile fluid 122 begins to condense, but the rate of condensation is limited by heat transfer through the second inflatable element 120 into ambient air. Therefore, this greater mass of gaseous volatile fluid 122 in the second inflatable element 120 may condense over a longer time period, thereby increasing an average net buoyancy of the aerial vehicle 100 when above the phase-transition altitude and enabling the aerial vehicle 100 to reach a higher altitude before reaching neutral buoyancy and transitioning to descent. In this implementation, the controller 160 can additionally or alternatively activate the heating element 139 when the aerial vehicle 100 is above the phase-transition altitude in order to decrease a condensation rate of the volatile fluid 122 and/or increase an evaporation rate of the volatile fluid 122, thereby increasing the net buoyancy of the aerial vehicle 100 when above the phase-transition altitude and enabling the aerial vehicle 100 to reach a higher peak altitude.

Conversely, the controller 160 can limit the mass of gaseous volatile fluid 122 passed into the volatile fluid 122 after transitioning to ascent at the descent-ascent transition altitude, thereby decreasing the ratio of gaseous to liquid volatile fluid 122 in the aerial vehicle 100, decreasing the average net buoyancy of the aerial vehicle 100 above the phase-transition altitude, and reducing the peak altitude reached by the aerial vehicle 100.

9.3 Ascent and Descent Rate Controls

Additionally or alternatively, the controller 160 can control (or "influence") ascent and descent rates of the aerial vehicle 100: by adjusting timing and volume of volatile-fluid released into the second inflatable element 120; and/or by controlling a rate of heat transfer into and out of the volatile fluid 122. By modulating evaporation and condensation rates of the volatile fluid 122, the controller 160 can influence instantaneous net buoyancy of the aerial vehicle 100 and thus control vertical acceleration of the aerial vehicle 100 and vertical speed of the aerial vehicle 100 across the operational altitude range.

In particular, when the aerial vehicle 100 is located below the phase-transition altitude, the controller 160 can activate the fan 134 and/or trigger the heatsink 132 vent to open in order to: increase airflow across the heatsink 132; increase a rate of thermal energy transfer from ambient air into volatile fluid 122 occupying the condensate vessel 130; increase a rate of vaporization of the volatile fluid 122; increases a rate of net-buoyancy increase of the aerial vehicle 100; and thus increase a rate of upward acceleration of the aerial vehicle 100. Similarly, the controller 160 can activate the heating element 139 in order to: directly increase heat transfer into the volatile fluid 122; increase an evaporation rate of the volatile fluid 122; increase a rate of net-buoyancy increase of the aerial vehicle 100; and thus increase a rate of upward acceleration of the aerial vehicle 100 below the phase-transition altitude.

Additionally or alternatively, the controller 160 can temporarily close one or more valves 126, 138 in order to constrain volatile fluid 122 within the sump 123 or within the condensate vessel 130 while activating the heating element 139, the fan, and/or the heatsink 132 vent in order to increase rate of heat transfer into the volatile fluid 122 and increase vapor pressure within the sump 123 or condensate vessel 130. The controller 160 can then trigger the valves 126, 138 to open to release volatile fluid 122—under elevated vapor pressure-through the nozzle 127 into the second inflatable element 120, thereby: generating smaller volatile-fluid droplets; increasing a rate of heat transfer from ambient air into the volatile fluid 122 via the second inflatable element 120; increasing a rate of vaporization of the volatile fluid 122 in the second inflatable element 120; increasing a rate of net-buoyancy increase of the aerial vehicle 100; and thus increasing a rate of upward acceleration of the aerial vehicle 100.

Furthermore, the controller 160 can shape ascent and descent rates by releasing subvolumes of volatile-fluid into the second inflatable element 120 over multiple stages. For example, the controller 160 can trigger the valves 126, 138 to open for a controlled time duration in order to: release a first portion of volatile fluid 122 into the second inflatable element 120 during descent below the phase-transition altitude; and achieve a relatively high average rate of descent and a relatively low average rate of ascent below the phase-transition altitude. The controller 160 can then trigger the valves 126, 138 open again after the aerial vehicle 100 transitions to ascent, thereby: releasing a second portion of volatile fluid 122 into the second inflatable element 120; increasing a total mass of volatile fluid 122 available to vaporize within the second inflatable element 120 while below the phase-transition altitude; and increasing an average rate of ascent over the aerial vehicle 100 as the aerial vehicle 100 rises toward the phase-transition altitude.

Furthermore, by releasing a larger mass of volatile fluid 122 into the second inflatable element 120 prior to ascending above the phase-transition altitude, the controller 160 can: increase a ratio of gaseous to liquid volatile fluid 122 in the second inflatable element 120 once above the phase-transition altitude; increase the average net buoyancy of the aerial vehicle 100 above the phase-transition altitude; and thus increase an average rate of ascent of the aerial vehicle 100 above the phase-transition altitude. Conversely, by evaporating a smaller mass of volatile fluid 122 in the second inflatable element 120 prior to crossing the phase-transition altitude, the controller 160 can: achieve a lower ratio of gaseous to liquid volatile fluid 122 in the second inflatable element 120 above the phase-transition altitude; decrease the average net buoyancy of the aerial vehicle 100 above the phase-transition altitude; and thus decrease an average rate of ascent of the aerial vehicle 100 above the phase-transition altitude.

9.4 Ascent/Descent Duration

Therefore, by controlling (or "influencing") descent-ascent and ascent-descent transition altitudes and ascent and descent accelerations, the controller 160 can control (or "influence") the ascent and descent durations within a macro oscillation cycle of the aerial vehicle 100.

For example, during ascent of the aerial vehicle 100, the controller 160 can: calculate or track a current ascent rate of the aerial vehicle 100; access a target ascent duration, between a descent-ascent transition altitude and an ascent-descent transition altitude, specified for the aerial vehicle 100; and estimate a real ascent duration of the aerial vehicle 100, between the descent-ascent transition altitude and the ascent-descent transition altitude, based on the current ascent rate. Then, in response to the real ascent duration exceeding the target ascent duration, the controller 160 can activate the heating element 139: to heat liquid volatile fluid 122 occupying the condensate vessel 130; to increase the evaporation rate of liquid volatile fluid 122 occupying the condensate vessel 130; to increase the rate of the net buoyancy increase of the aerial vehicle 100; and to decrease the real ascent between the descent-ascent transition altitude and the ascent-descent transition altitude for the current macro oscillation of the aerial vehicle 100.

By controlling (or "influencing") ascent and descent durations of the aerial vehicle 100 within a macro oscillation cycle, the controller 160 can further control (or "influence") the total time duration of a macro oscillation cycle of the aerial vehicle 100.

9.5 Feed-Forward Transition Altitude Control

Because weather conditions relative to altitude may be similar over two consecutive macro oscillations of the aerial vehicle 100, the aerial vehicle 100 can coordinate actuation of the heating element 139, valves 126, 138, fan, and/or heatsink 132 vent based on ambient conditions and/or a trajectory of the aerial vehicle 100 detected during the prior macro oscillation in order to more closely achieve a flight plan (e.g., maximum and minimum altitudes, macro oscillation duration, vertical velocity) during the current macro oscillation.

In one example, in response to the aerial vehicle 100 occupying a first altitude below the phase-transition altitude at a first time during a first descent of the aerial vehicle 100, the controller 160 can trigger the condensate valve 138 to transition from the closed position to the open position: to release evaporated volatile fluid 122, in the second mass of the volatile fluid 122, from the condensate vessel 130 into the second inflatable element 120; to increase the net buoyancy of the aerial vehicle 100; and to transition the aerial vehicle 100 from descent to ascent below the first altitude at a second time succeeding the first time. The controller 160 can then: calculate a first descent rate of the aerial vehicle 100 between the first time and the second time during the first descent; access a target minimum altitude—below the second phase-transition altitude—specified for the aerial vehicle 100 during a next descent; and calculate a trigger altitude at which release of the volatile fluid 122 into the second inflatable element 120 is predicted to transition the aerial vehicle 100 from descent to ascent at the target minimum altitude in light of the first descent rate during the previous descent. Then, in response to the aerial vehicle 100 occupying the trigger altitude at a third time during this next descent, the controller 160 can trigger the condensate valve 138 to transition from the closed position to the open position: to release evaporated volatile fluid 122, in the second mass of the volatile fluid 122, from the condensate vessel 130 into the second inflatable element 120; to increase the net buoyancy of the aerial vehicle 100; and to transition the aerial vehicle 100 from descent to ascent proximal the target minimum altitude at a fourth time succeeding the third time.

9.6 End-of-Life and Emergency Buoyancy Increase

In one variation, the condensate vessel 130 or the second inflatable element 120 includes a release valve, and the controller 160 can selectively trigger this release valve to vent the volatile fluid 122 in order to increase net buoyancy of the aerial vehicle 100, respectively, such as during an end-of-life sequence (e.g., when too little ballast remains in the aerial vehicle 100). Thus, in this variation, the volatile fluid 122 can function as an auxiliary ballast material.

10. PREDICTIVE CONTROLS

As described above, the controller 160 can: access a flight plan specifying target altitudes at target times or defining soft and hard altitude bounds for the aerial vehicle 100; collect raw telemetry via integrated or connected sensors, such as geospatial location, altitude, vertical velocity, local wind speed, temperature, humidity, and barometric pressure; and track altitude and vertical velocity of the aerial vehicle 100 based on these data. The controller 160 can also: predict a future path of the aerial vehicle 100 based on the current altitude and ascent or descent velocity; characterize differences between this predicted future path and the flight plan; and plan preemptive decisions—such as whether to vent ballast or lifting gas 112—to reduce these differences while minimizing consumption of finite resources (i.e., ballast, lifting gas 112, stored electrical energy) in order to extend operational life of the aerial vehicle 100.

10.1 Velocity-Based Altitude Prediction and Venting Control

In one implementation shown in FIG. 9, the controller 160: extrapolates a future ascent-descent transition altitude based on a current ascent rate of the aerial vehicle 100; and plans or withholds release of venting gas based on a difference between this future ascent-descent transition altitude and a target maximum altitude specified in the flight plan. The controller 160 can similarly: extrapolate a future descent-ascent transition altitude based on a current descent rate of the aerial vehicle 100; and plan or withhold release of ballast based on a difference between this future descent-ascent transition altitude and a target minimum altitude specified in the flight plan.

In one example, controller 160 accesses a target maximum altitude and a target minimum altitude specified for the aerial vehicle 100, such as in a flight plan. Before the aerial vehicle 100 reaches the target maximum altitude during an ascent of the aerial vehicle 100, the controller 160: calculates an ascent rate of the aerial vehicle 100; and estimates a predicted maximum altitude of the aerial vehicle 100 during the ascent based on the ascent rate. In response to the predicted maximum altitude falling below the target maximum altitude, the controller 160 withholds activation of the lifting gas vent 114—and thus withholds venting of lifting gas 112 from the first inflatable element 110—during this ascent. Conversely, in response to the predicted maximum altitude exceeding the target maximum altitude, the controller 160 can: calculate a vent duration based on (e.g., proportional to) the difference between the predicted maximum altitude and the target maximum altitude; and trigger the lifting gas vent 114 to open for this vent duration in order release lifting gas 112 from the first inflatable element 110, decrease net buoyancy of the aerial vehicle 100, and reduce the predicted maximum altitude toward the target maximum altitude.

In this example, during descent of the aerial vehicle 100 and before the aerial vehicle 100 reaches the target minimum altitude specified in the flight plan, the controller 160: calculates a descent rate of the aerial vehicle 100; and estimates a predicted minimum altitude of the aerial vehicle 100 during this descent based on this descent rate. In response to the predicted minimum altitude exceeding the target minimum altitude, the controller 160 withholds activation of the ballast valve 144—and thus withholds release of ballast material 142 from the ballast vessel 140—during this descent. Conversely, in response to the predicted minimum altitude falling below the target minimum altitude, the controller 160 can: calculate a ballast—release duration based on (e.g., proportional to) a difference between the predicted minimum altitude and the target minimum altitude; and trigger the ballast valve 144 to open for the calculated duration in order to increase net buoyancy of the aerial vehicle 100 and increase the predicted minimum altitude toward the target minimum altitude.

10.2 Stored Ascent and Descent Curves

In another implementation shown in FIG. 10, the controller 160 implements stored ascent and descent curves to predict future (e.g., upcoming, immediate, current) altitude trajectories of the aerial vehicle 100 and to plan lift gas and ballast venting actions accordingly.

Generally, the aerial vehicle 100 follows a velocity-versus-altitude ascent curve while ascending and a velocity-versus-altitude descent curve while descending. These curves vary across macro oscillations of the aerial vehicle 100 within its operational altitude range due to variations in ambient temperature, pressure, wind conditions, solar heating, and/or infrared heating and cooling. However, the controller 160 can store and access a corpus of velocity-versus-altitude ascent curves and descent curves such as: previously traversed by the aerial vehicle 100 and/or by other aerial vehicles; and/or annotated with lifting gas 112 and ballast venting actions previously executed by the aerial vehicle 100 or other aerial vehicle while traversing these curves.

During ascent, the controller 160 can: track the current ascent velocity of the aerial vehicle 100 and its altitude; match these current ascent velocity and altitude values to a nearest stored ascent curve; predict a future ascent path of the aerial vehicle 100—including an upcoming ascent-descent transition altitude—based on this nearest ascent curve; and plan lifting gas venting actions to align this ascent-descent transition altitude to a target maximum altitude specified in the flight plan. In particular, if the nearest descent curve is tagged with no venting of lifting gas 112 and indicates an ascent-descent transition altitude near or below the maximum altitude specified in the flight plan, the controller 160 can: set a flag to withhold venting of lifting gas 112; and/or activate the heating element 139 to increase net buoyancy of the aerial vehicle 100. If the nearest descent curve indicates an ascent-descent transition altitude above the maximum altitude specified in the flight plan, the controller 160 can set a flag to vent lifting gas 112 as the aerial vehicle 100 approaches the ascent-descent transition altitude . . . . If the nearest descent curve is annotated with venting of a particular volume of lifting gas 112 and indicates an ascent-descent transition altitude near the maximum altitude specified in the flight plan, the controller 160 can set a flag to vent the particular volume of lifting gas 112 as the aerial vehicle 100 approaches the ascent-descent transition altitude. Furthermore, if the nearest descent curve is annotated with venting of a particular volume of lifting gas 112 and indicates an ascent-descent transition altitude below the maximum altitude specified in the flight plan, the controller 160 can set a flag to vent less than the particular volume of lifting gas 112 as the aerial vehicle 100 approaches the ascent-descent transition altitude. The controller 160 can repeat this process to update lifting gas venting flags as the aerial vehicle 100 rises toward the target maximum altitude, such as once per minute or one per 250 feet of altitude gain.

During descent, the controller 160 can: track the current descent velocity of the aerial vehicle 100 and its altitude; match these current descent velocity and altitude values to a nearest stored descent curve; predict a future descent path of the aerial vehicle 100—including an upcoming descent-ascent transition altitude—based on this nearest descent curve; and plan ballast venting actions to align this descent-ascent transition altitude to a target minimum altitude specified in the flight plan. In particular, if the nearest stored curve is tagged with no venting of ballast and indicates a descent-ascent transition altitude near or above the minimum altitude specified in the flight plan, the controller 160 can: set a flag to withhold venting of ballast. If the nearest stored curve indicates a descent-ascent transition altitude below the minimum altitude specified in the flight plan, the controller 160 can set a flag to vent ballast as the aerial vehicle 100 approaches the descent-ascent transition altitude . . . . If the nearest stored curve is annotated with venting of a particular volume ballast and indicates a descent-ascent transition altitude near the minimum altitude specified in the flight plan, the controller 160 can set a flag to vent the particular volume of ballast as the aerial vehicle 100 approaches the descent-ascent transition altitude. Furthermore, if the nearest stored curve is annotated with venting of a particular volume of ballast and indicates a descent-ascent transition altitude above the minimum altitude specified in the flight plan, the controller 160 can set a flag to vent less than the particular volume of ballast as the aerial vehicle 100 approaches the descent-ascent transition altitude. The controller 160 can repeat this process to update ballast venting flags as the aerial vehicle 100 descends toward the minimum altitude, such as once per minute or one per 250 feet of altitude lost.

Therefore, during ascent, the controller 160 can: generate a current ascent-rate-versus-altitude profile of the aerial vehicle 100 based on current telemetry data; access a set of ascent curves stored in memory, wherein each curve represents ascent rate versus altitude up to a maximum altitude according to a prior ascent of the aerial vehicle 100 (or other aerial vehicle); identifies a first stored ascent curve—in this set of ascent curves—characterized by an ascent-rate-versus-altitude profile that most closely matches the current ascent-rate-versus-altitude profile of the aerial vehicle 100; and estimates the upcoming ascent-descent transition altitude of the aerial vehicle 100 based on the maximum altitude indicated in this first stored curve, assuming recreation of lifting gas venting actions executed by the aerial vehicle 100 (or other aerial vehicle) during the prior macro oscillation represented by this first stored ascent curve. The controller 160 can then plan lifting gas venting actions accordingly. Similarly, during descent, the controller 160 can: generate a current descent-rate-versus-altitude profile of the aerial vehicle 100 based on current telemetry data; access a set of descent curves stored in memory, wherein each curve represents descent rate versus altitude up to a minimum altitude according to a prior descent of the aerial vehicle 100 (or other aerial vehicle); identifies a first stored descent curve— in this set of descent curves—characterized by a descent-rate-versus-altitude profile that most closely matches the current descent-rate-versus-altitude profile of the aerial vehicle 100; and estimates the upcoming descent-ascent transition altitude of the aerial vehicle 100 based on the minimum altitude indicated in this first stored curve, assuming recreation of ballast venting actions executed by the aerial vehicle 100 (or other aerial vehicle) during the prior macro oscillation represented by this first stored descent curve. The controller 160 can then plan ballast venting actions accordingly.

10.3 Machine-Learning-Based Predictive Controls

In a similar variation, the controller 160 can access a model trained using machine-learning techniques on ascent and descent curves collected by one or more aerial vehicles. In this variation, the controller 160 can: pass current ascent or descent velocity-versus-altitude values (and ambient conditions such as wind speed, temperature, humidity, and pressure) into the model, which outputs a predicted ascent-descent or descent-ascent transition altitude and corresponding venting actions (e.g., target masses or volumes of vented lifting gas 112 or ballast). The controller 160 can then actuate the lifting-gas vent and the ballast valve 144 in order to align the predicted ascent-descent or descent-ascent transition altitude to the flight plan while minimizing consumption of lifting gas 112, ballast, and electrical energy.

10.4 Altitude Versus Time

Similarly and as shown in FIG. 10, the aerial vehicle 100 can follow an altitude—versus-time ascent curve while ascending and an altitude—versus-time descent curve while descending. These curves vary across macro oscillations of the aerial vehicle 100 within its operational altitude range due to variations in ambient temperature, pressure, wind conditions, solar heating, and/or infrared heating and cooling. Therefore, the controller 160 can additionally or alternatively store and access a corpus of altitude—versus-time ascent curves and descent curves such as: previously traversed by the aerial vehicle 100 and/or by other aerial vehicles; and/or annotated with lifting gas 112 and ballast venting actions previously executed by the aerial vehicle 100 or other aerial vehicle while traversing these curves. The controller 160 can then implement methods and techniques described above to generate a current altitude—versus-time curve, to match this current altitude—versus-time curve to a store ascent or descent altitude—versus-time curve, and to selectively coordinate venting and other actions at the aerial vehicle 100 accordingly.

11. RUNAWAY ASCENT PREVENTION

In one variation, the controller 160: triggers the condensate valve 138 between the condensate vessel 130 and the second inflatable element 120 to open after ascending above phase-transition altitude in order to enable liquid volatile fluid 122 to drain back into the condensate vessel 130; and triggers the condensate valve 138 to close as the aerial vehicle 100 approaches the target maximum altitude or approaches a second phase-transition altitude as which the volatile fluid 122 phases-changes from liquid back to gas in order to avoid runaway ascent of the aerial vehicle 100. Therefore, the condensate valve 138 can trap liquid volatile fluid 122 in the condensate vessel 130 and prevent the volatile fluid 122 from evaporating if the aerial vehicle 100 rises above the second phase-transition altitude.

12. SOLAR RADIATION

Generally, direct solar radiation incident on the second inflatable element 120 transfers thermal energy into the volatile fluid 122 contained therein. Therefore, despite presence above the phase-transition altitude in which ambient temperature and pressure promote condensation of the volatile fluid 122, solar radiation incident on the aerial vehicle 100 may: decrease a rate of condensation of the volatile fluid 122 in the second inflatable element 120 and slow a rate of net-buoyancy reduction of the aerial vehicle 100 during ascent; or evaporate liquid volatile fluid 122 in the bag, thereby increasing net buoyancy of the aerial vehicle 100 and increasing a maximum altitude reached by the aerial vehicle 100 during ascent.

Therefore, in the foregoing implementation in which the second inflatable element 120 is located outside of and below the first inflatable element 110, the aerial vehicle 100 can further include a reflective shroud 170 interposed between the first inflatable element 110 and the second inflatable element 120, as shown in FIG. 4. In particular, the reflective shroud 170 can shield the second inflatable element 120 from direct solar radiation and reduce solar heating of the second inflatable element 120.

In one example, the reflective shroud 170 is formed of a reflective polymer film, such as a mylar sheet tensioned between carbon-fiber rods and suspended between the first inflatable element 110 and the second inflatable element 120 to shield the second inflatable element 120 from overhead direct solar radiation. In another example, the reflective shroud 170: is formed of a reflective film formed of mylar, aluminum, or aluminized polymer arranged or shaped into a cone or dome; is perforated to allow airflow through the reflective shroud 170; and is located over an upper end of the second inflatable element 120 to shield this upper end of the second inflatable element 120 from direct solar radiation.

In one variation, the aerial vehicle 100 also includes an actuator configured to selectively extend and retract the reflective shroud 170. In this variation, the controller 160 can trigger the actuator to extend the reflective shroud 170 across a region of the second inflatable element 120 in order to reduce solar heating of the volatile fluid 122. For example, during a daytime cycle in which exposure to solar infrared and visible-spectrum radiation is high, the controller 160 can trigger the actuator to extend the reflective shroud 170 to decrease thermal energy absorbed by the second inflatable element 120, decrease an evaporation rate of the volatile fluid 122, and allow the volatile fluid 122 to passively condense within the second inflatable element 120 as the aerial vehicle 100 ascends above the phase-transition altitude. Conversely, the controller 160 can trigger the actuator to retract the reflective shroud 170 in order to increase solar heating of the volatile fluid 122 when the predicted maximum altitude of the aerial vehicle 100 is less than a target maximum altitude specified in a flight plan.

Additionally or alternatively, the aerial vehicle 100 can include a second reflective shroud 170 suspended below the second inflatable element 120 and configured to shield the second inflatable element 120 and the condensate vessel 130 from solar, visible, and infrared radiation reflected by the surface of the Earth. In this variation, the aerial vehicle 100 further includes a second actuator configured to deploy and retract the second reflective shroud 170, and the controller 160 can trigger this second actuator to deploy or retract the second reflective shroud 170 in order to modulate solar, visible, and infrared heating of volatile fluid 122 within the second inflatable element 120 and the condensate vessel 130 when the aerial vehicle 100 is located at low solar angles or when terrain below the aerial vehicle 100 exhibits high albedo.

Additionally or alternatively, the second inflatable element 120 can include a reflective coating spanning part or all of its external surface and configured to reduce solar heating of volatile fluid 122 contained therein.

13. NESTED INFLATABLE ELEMENTS

In one variation as shown in FIG. 5, the second inflatable element 120 nested (e.g., arranged entirely) within the interior volume of the first inflatable element 110. Because the second inflatable element 120 is enclosed within the first inflatable element 110, the first mass of lifting gas 112 occupies a region between the first inflatable element 110 and the second inflatable element 120 and functions as a thermal buffer that insulates the second inflatable element 120 and volatile fluid 122 contained therein from local fluctuations in ambient temperature and pressure outside of the first inflatable element 110. Accordingly, the second mass of volatile fluid 122 transitions between the liquid state and the gaseous state more directly as a function of pressure and temperature of the first mass of lifting gas 112 within the first inflatable element 110 rather than local ambient air temperature and pressure.

In this variation, the first inflatable element 110 and the first mass of lifting gas 112 cooperate to slow heat transfer between ambient air and volatile fluid 122 within the second inflatable element 120. According, during ascent of the aerial vehicle 100 above the phase-transition altitude, the inflatable element and the first mass of lifting gas 112 may reduce a condensation rate of volatile fluid 122 within the second inflatable element 120, thereby slowing reduction of the volatile-fluid component of the net buoyancy of the aerial vehicle 100, delaying transition from ascent to descent, and/or increasing the maximum altitude reached by the aerial vehicle 100 during ascent. Similarly, during ascent above the phase-transition altitude, as the second mass of volatile fluid 122 condenses within the second inflatable element 120, the volatile fluid 122 releases thermal energy into the first mass of lifting gas 112, which may temporarily increase the temperature of the lifting gas 112 above the local ambient air temperature, increase the net buoyancy of the aerial vehicle 100, delay transition from ascent to descent, and/or further increase the maximum altitude reached by the aerial vehicle 100 during ascent Conversely, during descent below the phase-transition altitude, the first inflatable element 110 and the first mass of lifting gas 112 cooperate to slow heat transfer into the volatile fluid 122 occupying the second inflatable element 120, which: reduces the evaporation rate of the volatile fluid 122; slows an increase in net buoyancy of the aerial vehicle 100; slows transition from descent to ascent; and/or decreases the minimum altitude reached by the aerial vehicle 100 during ascent.

Therefore, this nested configuration of the first inflatable element 110 and the second inflatable element 120 may dampens macro oscillations of the aerial vehicle 100 and yield slower, smoother altitude transitions that promote longer-duration stability over sharp or rapid altitude oscillations of the aerial vehicle 100 as the aerial vehicle 100 ascends and descends within its operational altitude range.

In this variation, the nested second inflatable element 120 can contain a sealed mass of volatile fluid 122 and operate in a fully passive mode in which the volatile fluid 122 naturally evaporates and condenses as the aerial vehicle 100 passes through the phase-transition altitude as described above, thereby passively smoothing macro-oscillation amplitude and period. Additionally or alternatively, a sump 123, valves 126, 138, a nozzle 127, and/or a pump 128 can be arranged within the second inflatable element 120 and actuated as described above. Additionally or alternatively, the second inflatable element 120—nested within the first inflatable element 110—can be fluidly coupled to a condensate vessel 130 and a valve, such as arranged within or outside of the first inflatable element 110 and actuated as described above.

14. INFLATABLE CONTROL ENVELOPE

In one variation as shown in FIG. 4, the aerial vehicle 100 includes: an inflatable control envelope 150 arranged around (i.e., encompassing, sealed about) the second inflatable element 120; an air pump 152 configured to pressurize the inflatable control envelope 150 with ambient air, thereby increasing a pressure applied to the second inflatable element 120 to promote condensation (and/or attenuate evaporation) of volatile fluid 122 within the second inflatable element 120; and a control vent 154 configured to release ambient air from the inflatable control envelope 150, thereby decreasing pressure applied to the second inflatable element 120 to slow a rate of condensation or increase a rate of evaporation of volatile fluid 122 within the second inflatable element 120.

In this variation, when the controller 160 activates the air pump 152, the air pump 152 inflates the inflatable control envelope 150, which increases pressure applied to the second inflatable element 120, which promotes condensation of the volatile fluid 122. As the volatile fluid 122 condenses within the second inflatable element 120, the second inflatable element 120 contracts and displaces a smaller volume of ambient air, which decreases the volatile-fluid component of the net buoyancy of the aerial vehicle 100. Therefore, in this variation, the controller 160 can actively decrease the net buoyancy of the aerial vehicle 100—without venting lifting gas 112—by activating the air pump 152 to pressurize the inflatable control envelope 150, such as at any altitude.

Conversely, when the controller 160 activates the control vent 154, the control vent 154 releases air from the inflatable control envelope 150, which decreases pressure applied to the second inflatable element 120, which enables volatile fluid 122 contained within the second inflatable element 120 to evaporate when the aerial vehicle 100 is below the phase-transition altitude (or to condense at a slower rate when the aerial vehicle 100 is above the phase-transition altitude). As the volatile fluid 122 evaporates, the second inflatable element 120 expands and displaces a greater volume of ambient air, which increases the volatile-fluid component of the net buoyancy of the aerial vehicle 100. Therefore, in this variation, the controller 160 can actively increase the net buoyancy of the aerial vehicle 100—without venting ballast—by triggering the control vent 154 to release air from the inflatable control envelope 150, such as at any altitude.

In this variation, the inflatable control envelope 150 can function as an active pressure-modulation shell that enables the controller 160 to directly regulate a phase state of the volatile fluid 122 (more) independent of local ambient pressure, local ambient temperature, and solar-heating conditions. For example, when the aerial vehicle 100 is descending slower than expected or planned, the controller 160 can activate the air pump 152 to increase pressure within the inflatable control envelope 150, accelerate condensation of the volatile fluid 122 within the second inflatable element 120, reduce the net buoyancy of the aerial vehicle 100, and thus increase the descent velocity of the aerial vehicle 100. Similarly, when the aerial vehicle 100 is ascending too rapidly, the controller 160 can activate the air pump 152 to increase pressure within the inflatable control envelope 150, accelerate condensation of the volatile fluid 122 within the second inflatable element 120, reduce the net buoyancy of the aerial vehicle 100, and thus decrease the ascent velocity of the aerial vehicle 100.

Therefore, with the second inflatable element 120 enclosed within the inflatable control envelope 150, the controller 160 can modulate pressure applied to the second inflatable element 120 via the air pump 152 and the control vent 154, thereby: actively regulating condensation and evaporation of volatile fluid 122 within the second inflatable element 120; influencing the net buoyancy of the aerial vehicle 100 without venting lifting gas 112 or ballast; and expand control authority available to the aerial vehicle 100, such as when operating near the phase-transition altitude or when subject to rapid atmospheric or radiative fluctuations.

15. PUMP-DRIVEN BUOYANCY CONTROL

In one variation, the volatile fluid 122 remains in the gaseous state across (much, most of) the operational altitude range of the aerial vehicle 100. In this variation, the aerial vehicle 100 further includes a pump (e.g., a gas-to-liquid compressor): coupled to the second inflatable element 120 and to the condensate vessel 130; and configured to actively pump the volatile fluid 122 from the second inflatable element 120 into the condensate vessel 130, thereby actively condensing the volatile fluid 122 into the liquid state. The controller 160 can therefore selectively activate the pump to actively condense the volatile fluid 122 into the liquid state and reduce net buoyancy of the arrival vehicle 100, such as rather than rely on passive condensation of the volatile fluid 122 induced by reduction in ambient pressures and temperatures during operation above the phase-transition altitude.

For example, in this variation, the pump: can include an inlet arranged within or fluidly coupled to the second inflatable element 120; and an outlet coupled to the condensate vessel 130 via a one-way (or "check") valve. The aerial vehicle can further include: the condensate valve 138 coupling the condensate vessel 130 to the second inflatable element 120 around the pump; and/or the heating element 139 configured to supply thermal energy to the condensate vessel 130 to induce (partial) vaporization of the volatile fluid 122 occupying the condensate vessel 130. Thus, in this example, the controller can: actively decrease net buoyancy of the aerial vehicle 100 when below the phase-transition altitude by activating the pump to condense gaseous volatile fluid 122 and to pump resulting liquid volatile fluid 122 into the condensate vessel 130 via the check valve; and actively increase net buoyancy of the aerial vehicle 100 when above the phase-transition altitude by triggering the condensate valve 138 to open and activating the heating element to vaporize liquid volatile fluid 122 in the condensate vessel 130, which expands through the condensate valve 138 into the second inflatable element 120.

In this variation, the volatile fluid 122 can also include multiple different volatile compounds that coexist in both liquid and gaseous phases within the second inflatable element 120 across a range of ambient pressures and temperatures. In particular, partial condensation of a first volatile compound while a second volatile compound remains gaseous within the second inflatable element 120 may: reduce total energy required to actively compress and pump the volatile fluid 122 into the condensate vessel 130; and thus reduce energy consumed by the aerial vehicle per unit of net buoyancy of the aerial vehicle 100 reduced by actively compressing the volatile fluid 122.

In a similar variation, the volatile fluid 122 can include a volatile compound characterized by a phase-transition altitude outside of the operating altitude range of the aerial vehicle 100 (or no phase-transition altitude), such as propane. Thus, in this variation, the controller can: actively decrease net buoyancy of the aerial vehicle 100 by activating the pump to condense gaseous volatile fluid 122 and to pump resulting liquid volatile fluid 122 into the condensate vessel 130 (e.g. via the check valve); and actively increase net buoyancy of the aerial vehicle 100 by triggering the condensate valve 138 to open and/or activating the heating element to release volatile fluid 122 from the condensate vessel 130 into the second inflatable element 120.

16. SINGLE INFLATABLE ELEMENT

In one variation as shown in FIG. 6, the aerial vehicle 100 includes a single inflatable element 110 containing both the first mass of lifting gas 112 and the second mass of volatile fluid 122. In this variation, the lifting gas 112 and the volatile fluid 122 occupy a common interior volume of the single inflatable element 110. The first mass of lifting gas 112 remains in the gaseous state across the operational altitude range of the aerial vehicle 100 and generates aerostatic lift. The second mass of volatile fluid 122 transitions between the liquid state and the gaseous state as a function of ambient temperature and pressure conditions encountered by the aerial vehicle 100 over its operational altitude range, as described above. More specifically, the volatile fluid 122 condenses as the aerial vehicle 100 ascends above the phase-transition altitude and evaporates as the aerial vehicle 100 descends below the phase-transition altitude.

In this variation, transitions of the volatile fluid 122 between the gaseous state and the liquid state may not be instantaneous and instead may occur over durations of time governed by rates of thermal energy transfer into and out of the volatile fluid 122 through the walls of the single inflatable element 110. As the aerial vehicle 100 ascends above the phase-transition altitude, the volatile fluid 122 releases thermal energy into the lifting gas 112 as the volatile fluid 122 condenses. As the aerial vehicle 100 descends below the phase-transition altitude, the volatile fluid 122 absorbs thermal energy from the lifting gas 112 and from ambient air via the wall of the single inflatable element 110 as the volatile fluid 122 evaporates. Therefore, the volatile-fluid component of net buoyancy may changes more gradually than in the foregoing variations in which the volatile fluid 122 is isolated within a separate inflatable element.

In this variation, the mass of volatile fluid 122 contained within the single inflatable element 110 can be selected such that, under normal atmospheric conditions encountered by the aerial vehicle 100 across its operational altitude range, substantially all of the volatile fluid 122 condenses at or below the maximum operational altitude of the aerial vehicle 100. When the volatile fluid 122 is fully condensed, the condensed volatile fluid 122 collects in a bottom region of the single inflatable element 110 and is substantially phase-separated from the lifting gas 112.

Accordingly, the aerial vehicle 100 can include a lifting-gas vent arranged at or near the upper region of the single inflatable element 110 such that opening the lifting-gas vent predominantly releases lifting gas 112—which is phase separated from and located above liquid volatile fluid 122 pooling in the bottom of the single inflatable element 110—while retaining the condensed volatile fluid 122. Therefore, across multiple macro oscillations of the aerial vehicle 100 within its operational altitude range, the second mass of volatile fluid 122 may remain substantially constant while the controller 160 selectively vents lifting gas 112 to adjust the net buoyancy of the aerial vehicle 100.

In this variation, the aerial vehicle 100 can also include a sump 123, valves 126, 138, a nozzle 127, and/or a pump 128 arranged within the single inflatable element 110 and actuated as described above. Additionally or alternatively, the single inflatable element 110 can be fluidly coupled to a condensate vessel 130 and a valve, such as suspended below the single inflatable element 110, as described above.

17. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. An aerial vehicle comprising:

a first inflatable element;

a first mass of lifting gas contained within the first inflatable element;

a second inflatable element coupled to the first inflatable element; and a second mass of a volatile fluid:

contained within the second inflatable element;

characterized by a saturation-vapor-pressure curve that intersects an atmospheric temperature-pressure profile within an operational altitude range of the aerial vehicle; and configured to:

condense during ascent of the aerial vehicle across a first phase-transition altitude, in the operational altitude range, to passively reduce a net buoyancy of the aerial vehicle; and evaporate during descent of the aerial vehicle across a second phase-transition altitude, in the operational altitude range, to passively increase the net buoyancy of the aerial vehicle.

2. The aerial vehicle of claim 1:

wherein the second mass of the volatile fluid comprises butane:

characterized by the saturation-vapor-pressure curve that intersects the atmospheric temperature-pressure profile of Earth atmosphere between 12,000 feet and 22,000 feet altitude; and exhibiting phase change between liquid and gas under ambient atmospheric conditions between 8,000 feet and 25,000 feet altitude.

3. The aerial vehicle of claim 1:

wherein, in a first configuration of the aerial vehicle configured to operate within the operational altitude range, the second mass of the volatile fluid comprises butane:

characterized by the saturation-vapor-pressure curve that intersects the atmospheric temperature-pressure profile of Earth atmosphere between 12,000 feet and 22,000 feet altitude; and wherein, in a second configuration of the aerial vehicle configured to operate within a second altitude range exceeding the operational altitude range, the second mass of the volatile fluid comprises a mixture of butane and a secondary volatile fluid:

characterized by a second saturation-vapor-pressure curve that intersects the atmospheric temperature-pressure profile of Earth atmosphere between 15,000 feet and 30,000 feet altitude.

4. The aerial vehicle of claim 1:

wherein the second inflatable element is nested inside of the first inflatable element;

wherein the first mass of lifting gas occupies a region of the first inflatable element between the first inflatable element and the second inflatable element;

wherein the first inflatable element and the first mass of lifting gas cooperate to thermally insulate the second inflatable element and the second mass of the volatile fluid from local transient changes in ambient temperature of air outside of the first inflatable element:

to slow a first rate of reduction of buoyancy by the second mass of the volatile fluid due to condensation during ascent of the aerial vehicle above the first phase-transition altitude; and to slow a second rate of reduction of the net buoyancy of the aerial vehicle during ascent of the aerial vehicle above the first phase-transition altitude; and wherein the second mass of the volatile fluid is configured to release thermal energy into the first mass of the lifting gas, via the second inflatable element, during condensation resulting from ascent of the aerial vehicle:

to slow a third rate of reduction of buoyancy by the first mass of the lifting gas due to ambient temperature reduction during ascent of the aerial vehicle; and to slow the second rate of reduction of the net buoyancy of the aerial vehicle during ascent of the aerial vehicle above the first phase-transition altitude.

5. The aerial vehicle of claim 1:

wherein the second inflatable element:

is located outside of the first inflatable element; and is suspended from the first inflatable element; and further comprising a reflective shroud:

interposed between the first inflatable element and the second inflatable element; and configured to:

shield the second inflatable element from direct solar radiation; and reduce a rate of evaporation of the second mass of the volatile fluid due to solar heating of the second inflatable element.

6. The aerial vehicle of claim 1, wherein the second inflatable element:

is located outside of the first inflatable element;

is suspended from the first inflatable element; and comprises a set of pleats that cooperate to:

present an expanded exterior surface area of the second inflatable element to ambient air; and promote transfer of thermal energy between ambient air and the second mass of the volatile fluid.

7. The aerial vehicle of claim 1:

wherein the second inflatable element:

defines a closed bottom that forms a sump; and comprises a film arranged over and enclosing the sump; and is configured to funnel liquid volatile fluid, in the second mass of the volatile fluid, toward the sump; and further comprising:

a passive check valve arranged on the film and configured to pass liquid volatile fluid, in the second mass of the volatile fluid, into the sump;

an active valve:

coupled to the sump;

operable in a closed position:

to retain volatile fluid, in the second mass of the volatile fluid, within the sump to limit increase in the net buoyancy of the aerial vehicle during descent of the aerial vehicle below the second phase-transition altitude; and operable in an open position:

to release gaseous volatile fluid, in the second mass of the volatile fluid, from the sump; and a nozzle:

arranged within the second inflatable element;

coupled to the active valve; and configured to atomize liquid volatile fluid, in the second mass of the volatile fluid, expanding from the sump, through the active valve, and into the nozzle in response to the active valve transitioning from the closed position to the open position:

to increase the net buoyancy of the aerial vehicle below the second phase-transition altitude.

8. The aerial vehicle of claim 1:

wherein the second inflatable element defines a closed bottom that forms a sump; and further comprising a pump:

coupled to the second inflatable element; and configured to spray liquid volatile fluid, in the second mass of the volatile fluid, occupying the sump toward an inner surface of the second inflatable element:

to increase a rate of heat transfer from ambient air into liquid volatile fluid, in the second mass of the volatile fluid, via the second inflatable element;

to increase an evaporation rate of liquid volatile fluid in the second mass of the volatile fluid; and to increase a rate of net buoyancy increase of the aerial vehicle below the second phase-transition altitude.

9. The aerial vehicle of claim 1, further comprising:

an inflatable control envelope encompassing the second inflatable element; and an air pump:

coupled to the inflatable control envelope; and configured to pump ambient air into the inflatable control envelope:

to increase pressure within the inflatable control envelope above a local ambient air pressure;

to increase pressure applied to the second inflatable element above the local ambient air pressure;

to induce condensation of gaseous volatile fluid, in the second mass of the volatile fluid, within the second inflatable element; and to reduce the net buoyancy of the aerial vehicle; and a vent:

coupled to the inflatable control envelope; and configured to release ambient air from the inflatable control envelope:

to decrease pressure within the inflatable control envelope toward the local ambient air pressure;

to decrease pressure applied to the second inflatable element toward the local ambient air pressure;

to increase evaporation of liquid volatile fluid, in the second mass of the volatile fluid, within the second inflatable element; and to increase the net buoyancy of the aerial vehicle.

10. The aerial vehicle of claim 1, further comprising:

a lifting gas vent:

coupled to the first inflatable element; and configured to vent lifting gas, in the first mass of lifting gas, from the first inflatable element to decrease the net buoyancy of the aerial vehicle;

a ballast vessel;

a third mass of a ballast material contained within the ballast vessel;

a ballast valve:

coupled to ballast vessel; and configured to release ballast material, in the third mass of ballast material, from the ballast vessel to increase the net buoyancy of the aerial vehicle; and a controller configured to:

access a target maximum altitude and a target minimum altitude specified for the aerial vehicle;

during an ascent of the aerial vehicle:

before the aerial vehicle reaches the target maximum altitude:

calculate a first ascent rate of the aerial vehicle; and estimate a predicted maximum altitude of the aerial vehicle during the ascent based on the first ascent rate; and in response to the predicted maximum altitude exceeding the target maximum altitude:

calculate a first vent duration based on a first difference between the predicted maximum altitude and the target maximum altitude; and activate the lifting gas vent for the first vent duration:

to vent lifting gas, in the first mass of lifting gas, from the first inflatable element;

to decrease the net buoyancy of the aerial vehicle; and to reduce the predicted maximum altitude toward the target maximum altitude; and during a descent of the aerial vehicle:

before the aerial vehicle reaches the target minimum altitude:

calculate a first descent rate of the aerial vehicle; and estimate a predicted minimum altitude of the aerial vehicle during the first descent based on the first descent rate; and in response to the predicted minimum altitude falling below the target minimum altitude:

calculate a second vent duration based on a second difference between the predicted minimum altitude and the target minimum altitude; and activate the ballast valve for the second vent duration:

to release ballast material, in the third mass of ballast material, from the ballast vessel;

to increase the net buoyancy of the aerial vehicle; and to increase the predicted minimum altitude toward the target minimum altitude.

11. The aerial vehicle of claim 1:

further comprising a condensate vessel fluidly coupled to the second inflatable element;

wherein the second inflatable element is configured to funnel liquid volatile fluid, in the second mass of the volatile fluid, into the condensate vessel; and further comprising:

a heatsink coupled to the condensate vessel;

a fan configured to direct ambient air across the heatsink; and a controller configured to activate the fan during descent of the aerial vehicle below the second phase-transition altitude:

to accelerate transfer of thermal energy from ambient air into liquid volatile fluid, in the second mass of the volatile fluid, occupying the condensate vessel;

to increase an evaporation rate of liquid volatile fluid, in the second mass of the volatile fluid, occupying the condensate vessel; and to increase a rate of net buoyancy increase of the aerial vehicle below the second phase-transition altitude.

12. The aerial vehicle of claim 11:

wherein the fan is configured to direct ambient air across the second inflatable element; and wherein the controller is further configured to activate the fan during ascent of the aerial vehicle above the first phase-transition altitude:

to accelerate transfer of thermal energy from gaseous volatile fluid, in the second mass of the volatile fluid, into ambient air via the second inflatable element and via the condensate vessel;

to increase a condensation rate of gaseous volatile fluid in the second mass of the volatile fluid; and to increase a rate of net buoyancy decrease of the aerial vehicle above the first phase-transition altitude.

13. The aerial vehicle of claim 1, further comprising:

a condensate vessel:

fluidly coupled to the second inflatable element; and a heating element:

coupled to the condensate vessel;

configured to heat liquid volatile fluid, in the second mass of the volatile fluid, occupying the condensate vessel:

to increase an evaporation rate of liquid volatile fluid, in the second mass of the volatile fluid, occupying the condensate vessel; and to increase a rate of net buoyancy increase of the aerial vehicle below the second phase-transition altitude.

14. The aerial vehicle of claim 13, further comprising a controller configured to:

during descent of the aerial vehicle below the second phase-transition altitude:

calculate a descent rate of the aerial vehicle;

access a target minimum altitude, below the second phase-transition altitude, specified for the aerial vehicle; and estimate a first transition altitude of the aerial vehicle, from descent to ascent, based on the descent rate; and in response to the first transition altitude falling below the target minimum altitude:

activate the heating element:

to heat liquid volatile fluid, in the second mass of the volatile fluid, occupying the condensate vessel;

to increase the evaporation rate of liquid volatile fluid, in the second mass of the volatile fluid, occupying the condensate vessel;

to increase the rate of net buoyancy increase of the aerial vehicle; and to transition the aerial vehicle, from descent to ascent, above the first transition altitude; and during ascent of the aerial vehicle:

calculate an ascent rate of the aerial vehicle;

access a target ascent duration, between a descent-ascent transition altitude and an ascent-descent transition altitude, specified for the aerial vehicle;

estimate a real ascent duration of the aerial vehicle, between the descent-ascent transition altitude and the ascent-descent transition altitude, based on the ascent rate; and in response to the real ascent duration exceeding the target ascent duration:

activate the heating element:

to heat liquid volatile fluid, in the second mass of the volatile fluid, occupying the condensate vessel;

to increase the evaporation rate of liquid volatile fluid, in the second mass of the volatile fluid, occupying the condensate vessel;

to increase the rate of net buoyancy increase of the aerial vehicle; and to decrease the real ascent duration.

15. The aerial vehicle of claim 1, further comprising:

a lifting gas vent:

coupled to the first inflatable element; and configured to vent lifting gas, in the first mass of lifting gas, from the first inflatable element to decrease the net buoyancy of the aerial vehicle;

a ballast vessel;

a third mass of a ballast material contained within the ballast vessel;

a ballast valve:

coupled to ballast vessel; and configured to release ballast material, in the third mass of ballast material, from the ballast vessel to increase the net buoyancy of the aerial vehicle; and a controller configured to:

access a target maximum altitude and a target minimum altitude specified for the aerial vehicle;

during a first ascent of the aerial vehicle:

before the aerial vehicle reaches the target maximum altitude:

calculate a first ascent rate of the aerial vehicle; and estimate a predicted maximum altitude of the aerial vehicle during the first ascent based on the first ascent rate; and in response to the predicted maximum altitude falling below the target maximum altitude:

withhold activation of the lifting gas vent to withhold venting of lifting gas, in the first mass of lifting gas, from the first inflatable element; and during a first descent of the aerial vehicle:

before the aerial vehicle reaches the target minimum altitude:

calculate a first descent rate of the aerial vehicle; and estimate a predicted minimum altitude of the aerial vehicle during the first descent based on the first descent rate; and in response to the predicted minimum altitude exceeding the target minimum altitude:

withhold activation of the ballast valve to withhold release of ballast material, in the third mass of ballast material, from the ballast vessel.

16. The aerial vehicle of claim 15, wherein the controller is configured to:

during the first ascent of the aerial vehicle:

access a first current altitude of the aerial vehicle; and estimate the predicted maximum altitude of the aerial vehicle during the first ascent by:

accessing a set of ascent curves from memory, each ascent curve in the set of ascent curves representing an ascent rate versus altitude up to an ascent-descent transition altitude;

identifying a first ascent curve, in the set of ascent curves, representing the first ascent rate versus the first current altitude; and estimating the predicted maximum altitude of the aerial vehicle during the first ascent based on a first ascent-descent transition altitude represented in the first ascent curve; and during the first descent of the aerial vehicle:

access a second current altitude of the aerial vehicle; and estimate the predicted minimum altitude of the aerial vehicle during the first descent by:

accessing a set of descent curves from memory, each descent curve in the set of descent curves representing a descent rate versus altitude up to a descent-ascent transition altitude;

identifying a first descent curve, in the set of descent curves, representing the first descent rate versus the second current altitude; and estimating the predicted minimum altitude of the aerial vehicle during the first descent based on a first descent-ascent transition altitude represented in the first descent curve.

17. The aerial vehicle of claim 1, further comprising:

a condensate vessel:

fluidly coupled to the second inflatable element; and a valve:

interposed between the second inflatable element and the condensate vessel;

operable in a closed position:

to retain volatile fluid, in the second mass of the volatile fluid, within the condensate vessel to limit increase in the net buoyancy of the aerial vehicle during descent of the aerial vehicle below the second phase-transition altitude; and operable in an open position:

to release gaseous volatile fluid, in the second mass of the volatile fluid, from the condensate vessel into the second inflatable element to increase the net buoyancy of the aerial vehicle during descent of the aerial vehicle below the second phase-transition altitude.

18. The aerial vehicle of claim 17, further comprising a controller configured to:

during a first descent of the aerial vehicle:

in response to the aerial vehicle occupying a first altitude below the second phase-transition altitude at a first time:

trigger the valve to transition from the closed position to the open position:

to release evaporated volatile fluid, in the second mass of the volatile fluid, from the condensate vessel into the second inflatable element;

to increase the net buoyancy of the aerial vehicle; and to transition the aerial vehicle from descent to ascent below the first altitude at a second time succeeding the first time;

calculate a first descent rate of the aerial vehicle between the first time and the second time;

access a target minimum altitude, below the second phase-transition altitude, specified for the aerial vehicle; and during a second descent of the aerial vehicle succeeding the first descent:

trigger the valve to transition from the open position to the closed position;

based on the first descent rate, calculate a trigger altitude at which release of the second mass of the volatile fluid into the second inflatable element is predicted to transition the aerial vehicle from descent to ascent at the target minimum altitude; and in response to the aerial vehicle occupying the trigger altitude at a third time:

trigger the valve to transition from the closed position to the open position:

to release evaporated volatile fluid, in the second mass of the volatile fluid, from the condensate vessel into the second inflatable element;

to increase the net buoyancy of the aerial vehicle; and to transition the aerial vehicle from descent to ascent proximal the target minimum altitude at a fourth time succeeding the third time.

19. The aerial vehicle of claim 17:

wherein the valve, in the closed position, is configured to hold liquid volatile fluid, in the second mass of the volatile fluid, in the condensate vessel under pressure exceeding ambient pressure during descent of the aerial vehicle below the second phase-transition altitude;

further comprising a nozzle:

coupled to the second inflatable element and to the condensate vessel; and configured to atomize liquid volatile fluid, in the second mass of the volatile fluid, expanding from the condensate vessel, through the valve, and into the nozzle in response to the valve transitioning from the closed position to the open position.

20. An aerial vehicle comprising:

a first inflatable element;

a first mass of lifting gas contained within the first inflatable element;

a lifting gas vent:

coupled to the first inflatable element; and configured to vent lifting gas, in the first mass of lifting gas, from the first inflatable element to decrease a net buoyancy of the aerial vehicle;

a second inflatable element coupled to the first inflatable element;

a second mass of a volatile fluid:

contained within the second inflatable element;

characterized by a saturation-vapor-pressure curve that intersects an atmospheric temperature-pressure profile within an operational altitude range of the aerial vehicle; and configured to condense during an ascent of the aerial vehicle across a phase-transition altitude, in the operational altitude range, to passively reduce a net buoyancy of the aerial vehicle; and a controller configured to:

access a target maximum altitude specified for the aerial vehicle;

during the ascent of the aerial vehicle:

before the aerial vehicle reaches the target maximum altitude:

calculate a first ascent rate of the aerial vehicle; and estimate a predicted maximum altitude of the aerial vehicle during the ascent based on the first ascent rate; and in response to the predicted maximum altitude falling below the target maximum altitude:

withhold activation of the lifting gas vent to withhold venting of lifting gas, in the first mass of lifting gas, from the first inflatable element.

\* \* \* \* \*